United States Patent
Nakayama et al.

[11] Patent Number: 6,166,810
[45] Date of Patent: Dec. 26, 2000

[54] METHOD AND APPARATUS FOR DETERMINING DISTANCE

[75] Inventors: Joji Nakayama; Atsushi Katayama, both of Tokyo, Japan

[73] Assignee: Nippon Telegraph and Telephone Corporation, Japan

[21] Appl. No.: 09/204,938

[22] Filed: Dec. 3, 1998

[30] Foreign Application Priority Data

Dec. 5, 1997 [JP] Japan .................................. 9-335889

[51] Int. Cl.[7] .................................................. G01B 11/24
[52] U.S. Cl. ............................................................ 356/376
[58] Field of Search ................................ 356/376, 237.2, 356/237.1

[56] References Cited

U.S. PATENT DOCUMENTS

| | | | |
|---|---|---|---|
| 4,708,483 | 11/1987 | Lorenz | 356/376 |
| 4,961,144 | 10/1990 | Ozeki et al. | 364/559 |
| 4,971,443 | 11/1990 | Koyagi | 356/375 |

FOREIGN PATENT DOCUMENTS

| | | | |
|---|---|---|---|
| 61-130808 | 6/1986 | Japan | G01G 11/24 |
| 61-180102 | 8/1986 | Japan . | |
| 04283607 | 10/1992 | Japan | G01B 11/24 |
| 59-119545 | 7/1994 | Japan . | |
| 7-83654 | 3/1995 | Japan . | |
| 07208948 | 8/1995 | Japan | G01B 11/24 |
| 8-247734 | 9/1996 | Japan . | |
| 10-111106 | 4/1998 | Japan . | |
| 10-111107 | 4/1998 | Japan . | |

OTHER PUBLICATIONS

Ishi et al., "A Laser Vision Sensor for a Tracking Robot," Covers Sensing Instrument Control Engineering Systems Information Computer Ergonomics, pp. 107–111, 1994 (w/ English Abstract).

T. Sueda, "Use and Problems of Optical Devices," Optronics, pp. 109–115, 1995 (w/ English Abstract).

*Primary Examiner*—Richard A. Rosenberger
*Attorney, Agent, or Firm*—Pennie & Edmonds LLP

[57] ABSTRACT

A method and apparatus for precision distance measurement are provided to perform accurate measurement of distance to an object according to light spots formed on the light receiving surface of a detector even when multiple reflections are involved. A beam of light emitted from a light source and reflected from the object is focused on the viewing surface as light spots through an optical member. The focal position of a reflected beam of light is determined according to a focal position detection process. When there are peaks in a luminosity curve generated on the detector, prior to performing the focal position detection process, the peaks are separated into individual light spots and a correct light spot for deriving the precise distance is selected by a selection process.

32 Claims, 20 Drawing Sheets

METHOD AND APPARATUS FOR DETERMINING DISTANCE

BACKGROUND OF THE INVENTION

1. Field of the Invention

The present invention relates in general to method and apparatus for distance determination, and relates in particular to a distance measuring technology applicable to various kinds of manufacturing machines and evaluation apparatuses.

This application is based on patent application No. Hei 9-335889 filed in Japan, the content of which is incorporated herein by reference.

2. Description of the Related Art

Distance measuring apparatus is an integrated part of various equipment for manufacturing, fabricating, measuring and evaluating activities, and non-contacting distance measuring apparatus (distance sensor) is a known example in such applications.

Non-contacting distance sensors include ultrasonic and laser range sensors, but laser range sensors are preferred when the application requires rapid response and high precision.

FIG. 16 shows a schematic illustration of how a conventional laser range sensor operates.

In this diagram, 1 represents a light source, 2 a light beam generated from the light source 1, 3 a measuring object, 7 a reflected beam from the surface of the measuring object 3, 8 an optical member, 9 a photo-detector member 9, and 10 a light receiving surface of the member 9.

As shown in this diagram, laser range sensor is comprised by a laser beam output section for emitting a laser beam 2 generated from the light source 3 towards the measuring object 3, and a light input section for focusing the reflected beam 7 leaving the surface of the measuring object 3 at a light spot on the surface of the light receiving surface 10 of the photo-detector 9 through an optical member 8.

Photo-detector 9 is a member to convert the luminous energy falling on the light spot focused on the light receiving surface 10 to electrical signals, and may include, for example, a one-dimensional charge coupled device (CCD) or one-dimensional position sensitive device (PSD).

The optical member 8 may commonly be a mirror, prism, or lens, but in FIG. 16, the laser range sensor uses only a lens for the optical member.

Also, although not shown in the diagram, a laser range sensor is generally provided with a control section for controlling the output and input sections and a computation section for determining the distance to the object according to measured data from the input section.

Such laser range sensors operate by directing a light beam 2 to form a light spot on the surface of the measuring object 3 generated from the light source 1, and forming another light spot on the receiving surface 10 created by focusing a reflected beam 7 through the optical member (receiving lens) 8.

In this case, as illustrated in FIG. 17, the focal position on the receiving surface 10 changes depending on the distance to the measuring object 3.

The distance to the object 3 can be determined by calibrating the correlation between the focal positions and distances, in terms of the known distances to the objects (3a, 3b).

Further details of range sensors are discussed in references, such as "Use and Problems of Optical Devices" (Sueda Tetsuo, Optronics, 1995).

One of the critical parameters in determining the precision of measurement by laser range sensor is the precision by which the positions of the light spots on the light receiving surface 10 of the photo-detector 9 are determined.

When the photo-detector 9 is made of a one-dimensional CCD, the light receiving surface 10 is comprised by a number of pixels disposed along a straight line, and the luminous energy of the light falling on each pixel can be converted to electrical signals of given magnitudes.

Therefore, by processing the electrical signals and obtaining a peak position or a weighted average position of luminous energy, it is possible to know which pixel position corresponds to the focal position of the reflection light spot.

When the photo-detector 9 is made of a one-dimensional PSD, it is possible to know the focal position of reflection light spot by processing the electrical signals output from the PSD to give the weighted average position of luminous energy as a ratio to the total length of the PSD, as illustrated in FIG. 18.

Accordingly, in principle, laser range sensors determine the distance by receiving a beam reflected only once from m the object 3 (simple reflection beam 7) in the photo-detector 9.

When the surface of the object 3 is glossy, a beam first reflected from the object surface may be reflected again by other surfaces (causing multiple reflections) and then return to the sensor, such that there for cases in which the simple reflection beam 7 becomes mixed with multiple reflection beam and the correct position of the simple reflection beam 7 cannot be determined with precision. In such a case, the measurement precision is significantly reduced.

To understand the loss of measurement precision in more detail, it is necessary to explain how multiple reflections affect the precision of measurements.

When multiple reflections occur, a plurality of light points are produced on the light receiving surface for that the method based on peak luminosity cannot provide the correct position of the simple reflection beam 7, because the position corresponding to the peak luminosity does not necessarily indicate the position of the simple reflection beam 7.

Using the method of weighted average luminosity, weighting tends to be shifted towards the positions of multiple reflection, and again it is not possible to determine the correct position of the simple reflection beam 7. This effect is illustrated in FIG. 19.

Multiple reflection is classified as either 2nd-order (reflected twice), 3rd-order (three times) or 4th-order multiple refection, depending on the number of times the light is reflected during the interval from leaving the light source 1 to entering into the photo-detector 9.

An example of a multiple reflection is illustrated in FIG. 20 using a case involving a 2nd-order reflection beam 15.

The 2nd-order reflection beam 15 can be avoided to some extent by orienting and operating the photo-detector 9 properly. This will be explained below with reference to FIGS. 21 and 22.

When the detector 9 and a scanner mirror 12 are oriented as shown in FIG. 21, the 2nd-order reflection beam 15 is received in the detector 9, but when they are oriented as shown in FIG. 22 to coincide the two beams, the 2nd-order reflection beam 15 cannot be received by the detector 9.

Therefore, by operating the measuring equipment suitably by redirecting the incident beam with respect to the object 3 with the use of a scanner mirror 12, it is possible to avoid detrimental effects of the 2nd-order reflection beam 15.

A 3rd-order reflection beam 16 such as the one illustrated in FIG. 23 is generated when the surface of an object 18 is glossy and another object 19 (for example, without glossy surface) is present nearby.

As illustrated in FIG. 23, a 3rd-order reflection 16 is produced when a light beam 2 emitted from a light source 1 is specularly reflected (as from a mirror surface) from the surface of a glossy object 18, which is the measuring object 3, and is then reflected diffusely from the surface of a dull object 19, and the diffused reflected light is reflected, for the third time, from the surface of the measuring object 3 before reaching the detector 9.

In other words, this pattern of reflection may be said to be a result of the surface of the glossy object 18 acting as a mirror to generate a mirror image 20 of the dull object 19 so that a light spot focused by the 3rd-order reflection represents the distance to the mirror image 20.

It should be noted that the 3rd-order reflection beam 16 cannot be avoided by simply altering the arrangement of components in the optical system, because the laser range sensor, which is a light-based system, follows the basic principles of optics.

Although multiple reflection beams of 4th-order or higher do exist in principle, optical power is attenuated at each reflection so that adverse effects of reflection beams of higher than 4th-order can be neglected in practice.

SUMMARY OF THE INVENTION

It is an object of the present invention to overcome the problems in conventional laser range sensors by providing an apparatus and a method to enable to provide accurate distance measurement even if 3rd-order reflections exist in the environment, which cannot be avoided in principle by altering the arrangement of the optical components in the system.

The object has been achieved in a method and an apparatus to perform the method comprising the steps of:

directing a light beam generated from a light source on a measuring object; focusing reflection beams reflected from the measuring object on a receiving surface of a photo-detector member through an optical device to generate a luminous energy distribution;

performing a spot separation process; if a plurality of peaks exist in the luminous energy distribution curve, selecting a necessary light spot;

determining a focal position of the selected light spot on the light receiving surface, thereby deriving the distance to the object.

The object is achieved also by providing an application program recorded in a computer-readable recording medium and executing the program by a computer system.

Accordingly, a light spot formed by multiple reflection beam can be separated from a light spot formed by the simple reflection beam, thereby enabling to derive the distance precisely even for an object which is susceptible to producing multiple reflections because of its glossy surface.

The present invention is enabled by providing a method for each of the processes of spot separation, spot selection, luminosity distribution restoration and focal position detection.

Accordingly, a method is provided for separating a plurality of light spots, formed simultaneously on a light receiving surface provided in a photo-detector member of not less than one-dimensional response capability, producing a luminous energy distribution exhibiting a plurality of peaks in not less than one-dimension, wherein a maximum value of each peak, minimum values and inflection points surrounding the maximum value are computed for each peak in the luminous energy distribution, and the luminous energy distribution is divided into individual luminosity curves at either a minimum value or an inflection point whichever is closer to the maximum value.

The object is enabled by providing a method for selecting a light spot created from a plurality of light spots, formed simultaneously on a light receiving surface provided in a photo-detector member of not less than one-dimensional response capability, producing a plurality of maximum values in a luminous energy distribution generated by the photo-detector member, by selecting a light spot whose maximum value exceeds a threshold intensity value and whose derived distance to a measuring object is a minimum.

The object is also enabled by providing a method for restoring luminosity to individual luminosity curves, when the curves are partly or wholly produced on a light receiving surface provided in a photo-detector member of not less than one-dimensional response capability, by applying a selected distribution function to a luminosity curve so as to restore complete luminosity to the luminosity curve.

The object has also been achieved in a method for determining the focal distance of the light spots from the individual luminosity curves obtained by the spot separation process.

The object can also be achieved by providing an application program recorded in a computer-readable recording medium and executing the program by a computer system.

Thus, all the necessary steps, in achieving the basic object of deriving a precise distance to the object, have been provided through the process of separating the light spots, selecting a necessary light spot, restoring luminosity of the selected light spot and detecting the focal position of the selected light spot.

DESCRIPTION OF THE PREFERRED EMBODIMENTS

Figure 1:
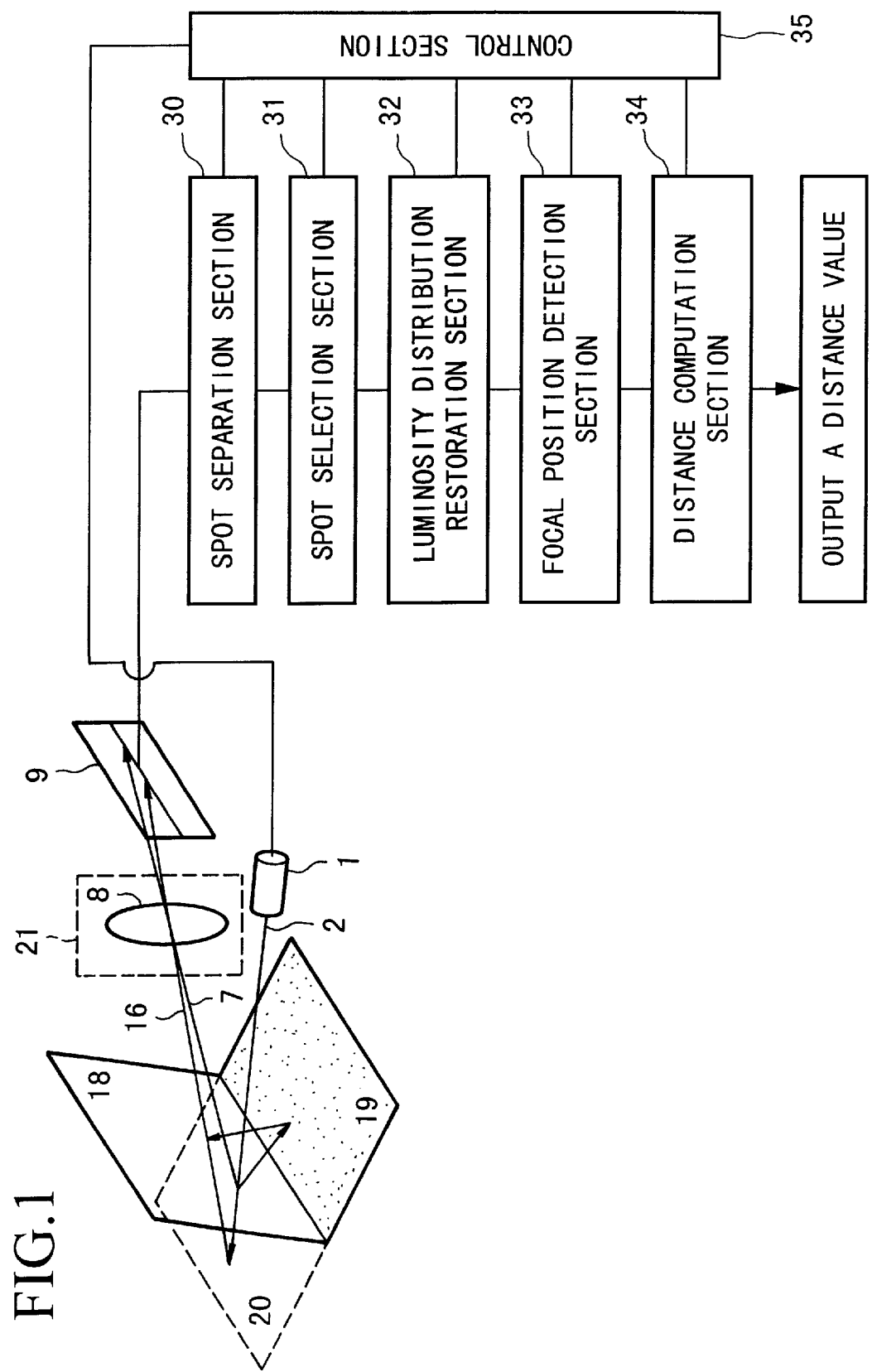
FIG. 1 is a schematic diagram of a first embodiment of the distance measuring apparatus of the present invention.

The following embodiments are presented to illustrate the basic principle of the method, and are not intended to limit the invention disclosed in the claims. It is not essential that all the combination of the features presented in the embodiments are necessary in attempting to solve various problems which may appear in actual distance measurements.

Preferred embodiment will be presented in the following with reference to the drawings.

In all the drawings, those components having similar functions are referred to by the same reference numerals and their explanations are not repeated.

Embodiment 1

Figure 2:
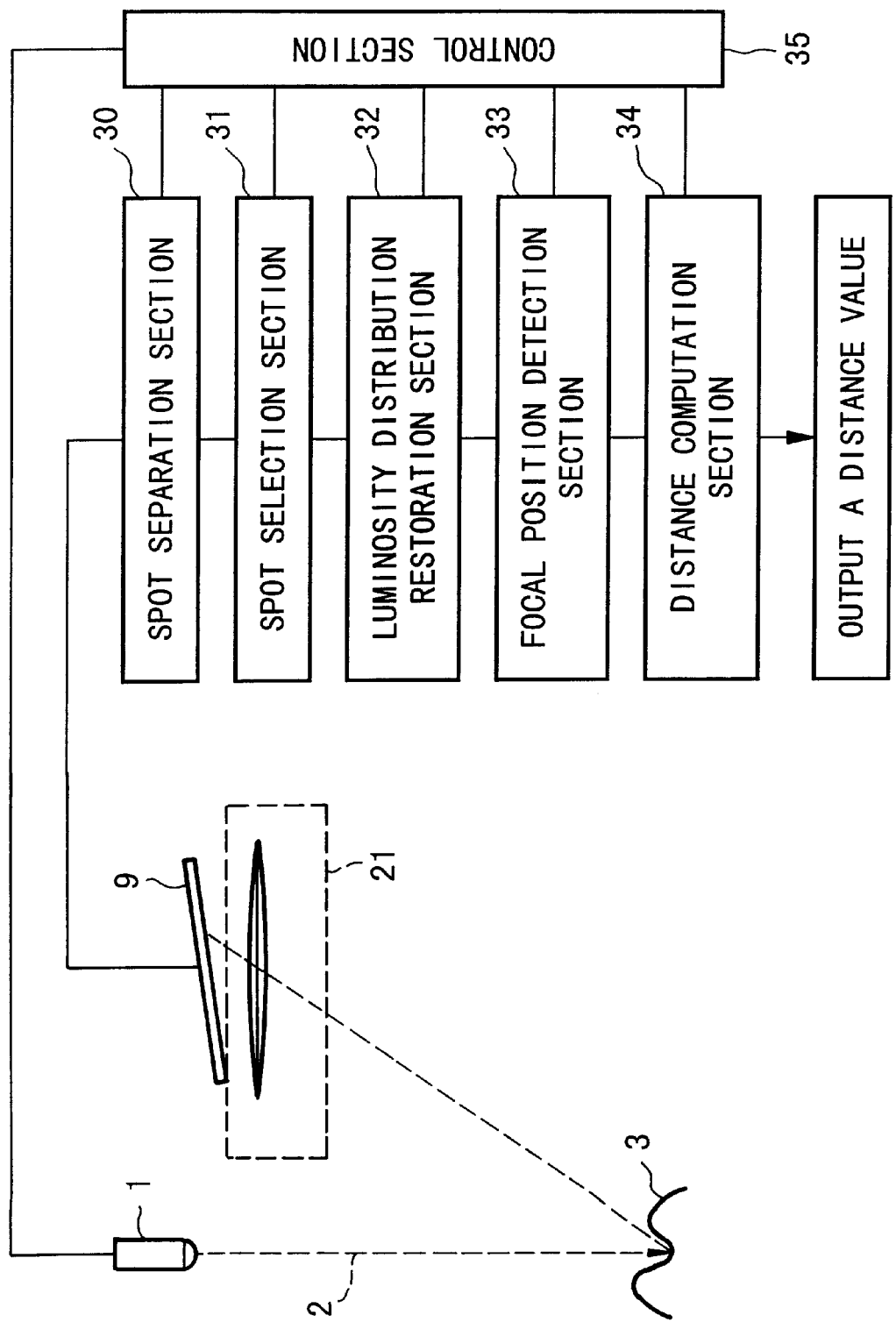
FIG. 2 is a diagram to explain the operational steps of the distance measuring apparatus in the first embodiment.

Embodiment 1 will be presented with reference to FIG. 2 which shows a schematic arrangement of the distance measuring apparatus.

In the drawing, 1 represents a light source, 2 an optical beam generated from the light source 1, 3 a measuring object, 9 a detector member, 21 an input section, 30 a spot separation section, 31 a spot selection section, 32 a luminosity distribution restoration section, 33 a focal position detection section, 34 a distance computation section, and 35 a control section.

Figure 23:
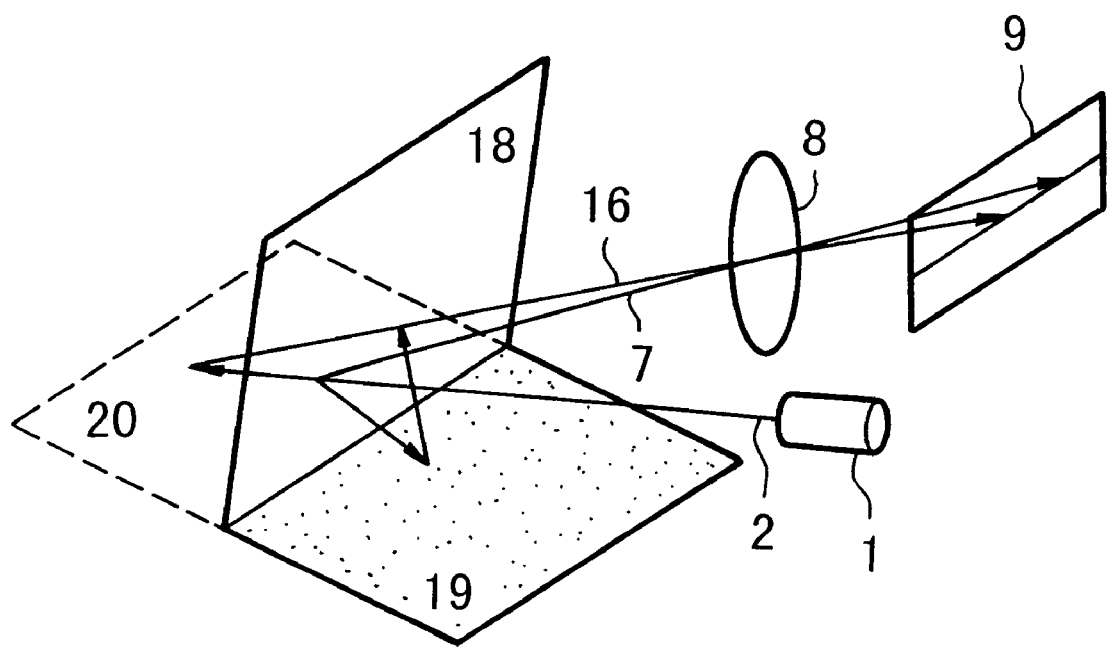
FIG. 23 is an illustration to explain the principle of generation of multiple reflections.

In the present embodiment of the distance measuring apparatus, a light beam 2 emitted from the light source 1 is radiated onto a measuring object 3, and reflection beams from the surface of the object 3 (a simple reflection beam 7 and a multiple reflection beam 16 shown in FIG. 23) are passed through an input section 21 comprised by a mirror, a prism, and a lens to focus a light spot on the light receiving surface of the detector 9. The control section 35 controls and operates the beam output section and the input section 21.

Based on a luminous energy distribution generated by the detector member 9, each light spot is separated individually in the spot separation section 30, and the position of the light spot focused by the simple reflection beam 7 is selected by the spot selection section 31.

Further, the luminous energy distribution of the simple reflection beam selected by the spot selection section 31 is restored in the luminosity distribution restoration section 32, and focal position of the simple reflection beam 7 is obtained in the focal position detection section 33, and the distance to the object 3 is computed in the distance computation section 34.

This configuration of the present apparatus enables to determine the distance precisely, even in a multiple refection environment.

Also, the control section 35 controls all the devices in the processing sections (30–34).

FIG. 1 shows a schematic arrangement of the apparatus of Embodiment 1.

As shown in this diagram, the present apparatus direct a beam 2 emitted from the light source 1 to an object 18 having glossy surface, and a reflection beam reflected from the surface of the glossy object 18 is passed through an input section 21 comprised by a mirror, a prism and a lens and the lie, and is focused on the light receiving surface of the detector member 9 to form a light spot.

Also, the beam 2 emitted from the light source 1 undergoes a simple reflection on the glossy object 18 first, and then undergoes a multiple reflection on a neighboring object 19, having a dull surface, and a multiple reflected beam is again reflected on the surface of the object 18 to cause a 3rd-order reflection beam 16 which is also focused as a light spot on the light receiving surface of the detector member 9.

Figure 3:
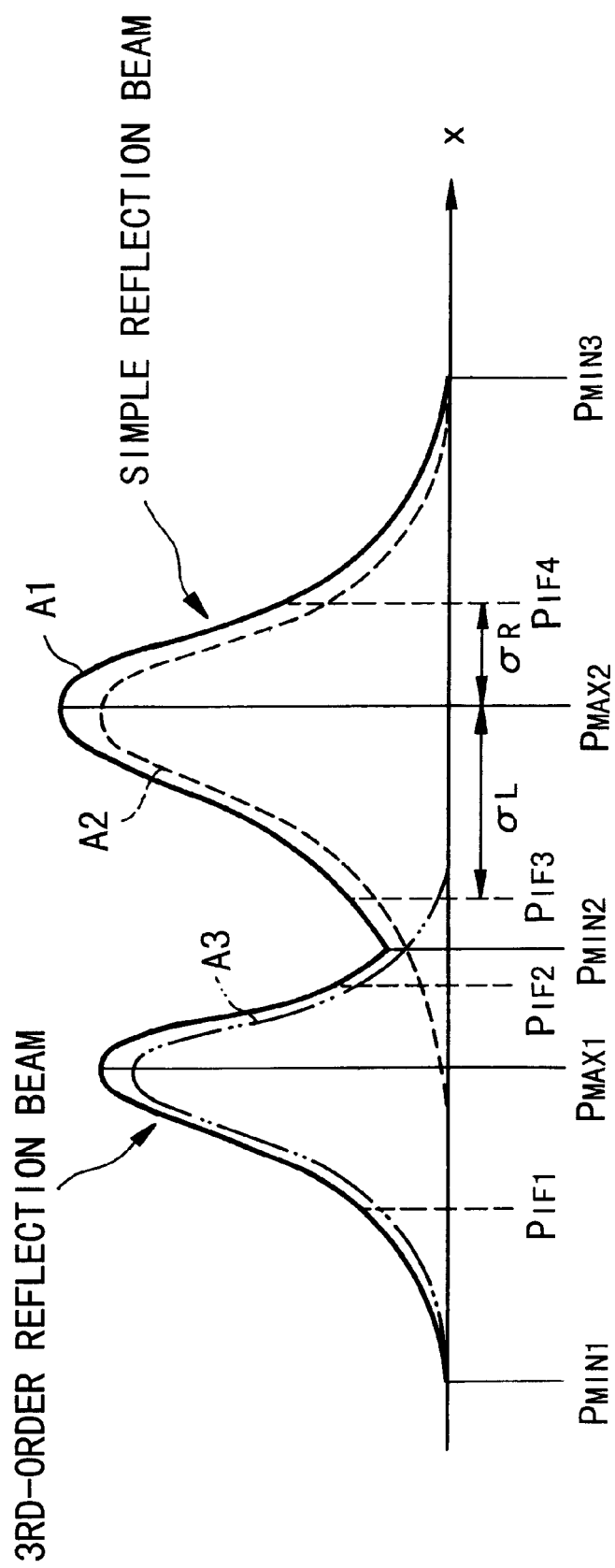
FIG. 3 is a diagram showing the luminous energy distribution of light spots formed on the light receiving surface of the photo-detector, by a simple reflection beam and a 3rd-order reflection beam.

FIG. 3 shows luminous energy distributions of the light spots focused on the light receiving surface of the detector member 9 by the simple reflection beam 7 (right peak) and the 3rd-order reflection beam 16 (left peak). FIG. 3 relates to a case in which both beams 7, 16 are received by the detector member 9.

It should be noted in FIG. 3 that A2 relates to a luminous energy distribution curve created by the simple reflection beam 7 only, the A3 relates to the same created by the 3rd-order reflection beam 16 only, and the A1 represents the luminous energy distribution curve created by both beams 7 and 16.

Figure 26:
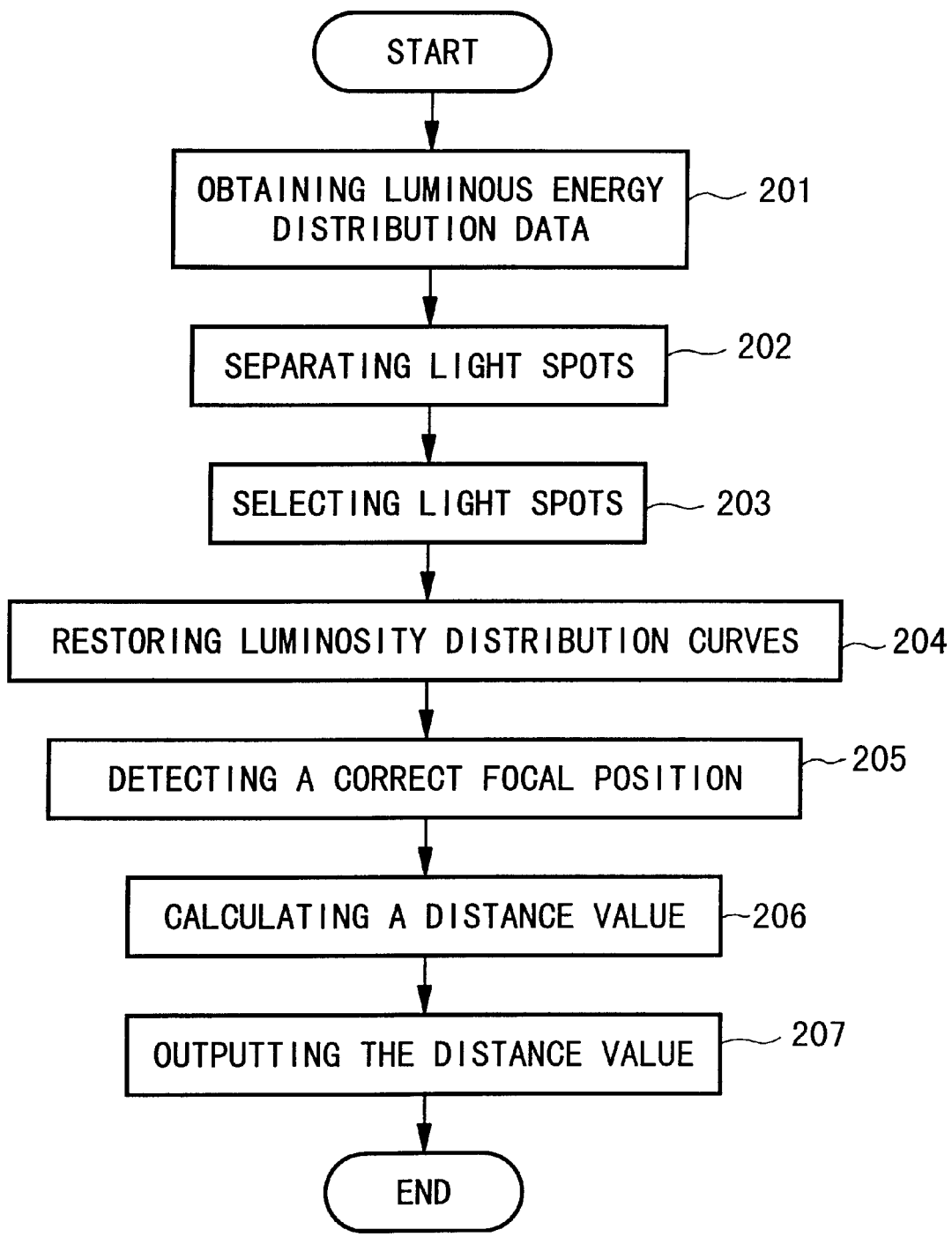
FIG. 26 is a flowchart showing the operational steps for the distance measuring apparatus of the present invention.

Next, the operation of the distance measuring apparatus when the detector member 9 detects a luminous energy distribution curve A1 shown in FIG. 3 will be explained with reference to FIG. 26.

When a luminous energy distribution curve exhibiting a plurality of peaks is obtained (step 201), the spot separation section 30 performs separation of light spots using the maximum, minimum and inflection points of the distribution curves (step 202).

Spot selection section 31 selects a light spot for the simple reflection from the separated light spots, using the maximum value of the distribution curves (step 203).

Luminosity distribution restoration section 32 restores luminosity for the light spot focused by the simple reflection beam by entering the values of the maximum and inflection points of the light spot selected in step 203 (step 204).

Focal position detection section 33 determines the focal position of the restored curve on the light receiving surface of the detector member using the restored energy distribution curve restored in step 204 (step 205).

Next, the distance computation section 34 computes the distance from the focal position detected in step 205 to the measuring object using the triangulation technique (step 206), and outputs a value for the distance (step 207).

In the following, a method of calculating the distance from the luminous energy distribution graph shown in FIG. 3 will be explained by presenting the successive steps performed in the computational process.

When the luminous energy distribution data obtained by the detector member 9 are inputted into the spot separation section 30, the following operation of the section 30 is going to start.

[Spot Separation Section 30]

Figure 4:
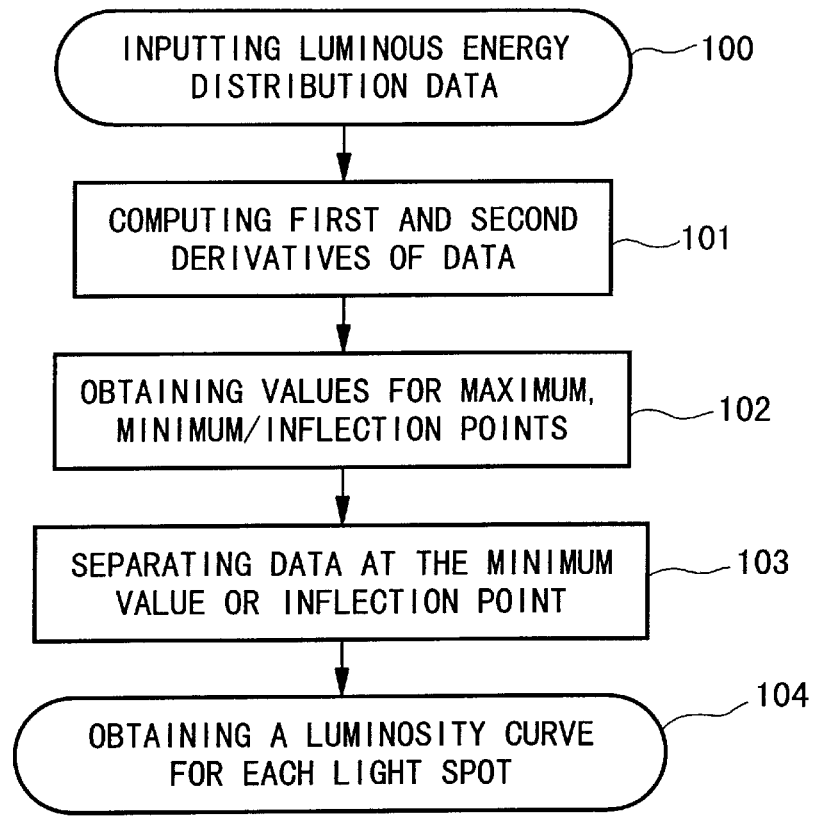
FIG. 4 is a flowchart showing the processing steps in the spot separation section in the first embodiment.

FIG. 4 shows a flowchart of the processing steps performed in the spot separation section 30.

When the luminous energy distribution data obtained by the detector member 9 are entered into the spot separation section 30 (step 100), first and second differentiation steps are carried out on the energy distribution data (step 101), and the extreme values and the points of inflection of the distribution data are computed (step 102).

Next, the minimum values of the light spots on the detector member 9 are used to separate each spot of the various light spots (step 103), so as to separate the luminosity curve for each light spot (step 104).

Specifically, the energy distribution data obtained by the detector member 9 are subjected to first differentiation to obtain the coordinate points $p_{MAX1}$ ($x_{MAX1}$, $y_{MAX1}$) and $p_{MAX2}$ ($x_{MAX2}$, $y_{MAX2}$) for maximum values.

Similarly, the coordinates for the minimum values are $p_{MIN1}$ ($x_{MIN1}$, $y_{MIN1}$), $p_{MIN2}$ ($x_{MIN2}$, $y_{MIN2}$), and $P_{MIN3}$ ($x_{MIN3}$, $y_{MIN3}$).

Next, by performing a second differentiation, the inflection points $p_{IF1}$, $p_{IF2}$, $p_{IF3}$, $p_{IF4}$ of the curves are obtained.

First derivatives relate to extreme values at zero slope to give maximum and minimum values of the curves, and zero values in the second derivatives relate to the inflection points.

Next, each light spot on the distribution curve is separated into corresponding luminosity curves at their minimum values $p_{MIN2}$ ($X_{MIN2}$, $y_{MIN2}$).

The energy distribution data for each light spot obtained in the spot separation section 30 are input into the spot selection section 31.

[Spot Selection Section 31]

Spot selection section 31 examines all the maximum values in the distribution data, and selects one maximum value, which exceeds a threshold value and represents the shortest distance to the object, as the correct light spot focused by the simple reflection beam 7.

Also, the luminous energy distribution data are divided into individual luminosity values due to the simple reflection beam 7 and the 3rd-order reflection beam 16 using the left and right inflection points closest to the respective peak values as the boundary.

Figure 5:
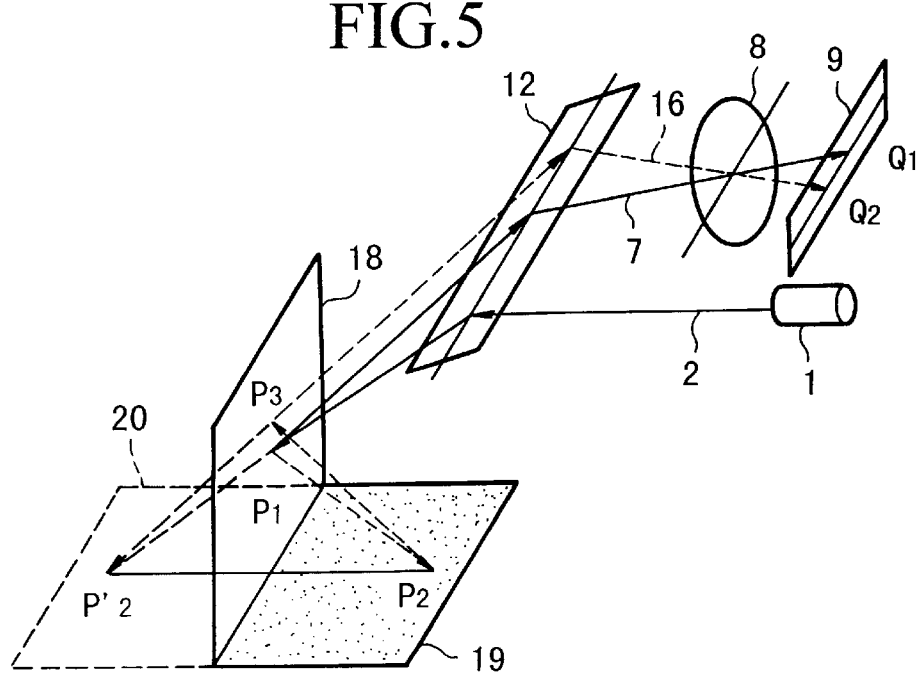
FIG. 5 is an illustration of light paths of a 3rd-order reflection beam.

FIG. 5 shows an example of the light path of a 3rd-order reflection beam 16. In FIG. 5, a simple reflection beam 7 reflects from a point P1 on a glossy object 18, and a part of the beam then focuses, through a scanner mirror 12 and a lens 8, at point Q1, on the detector member 9.

Here, because the point P1 is on a glossy object 18, a part of the beam reflected from point P1 arrives at a point on a nearby matte object 19.

Because the object 19 has a matte surface, the laser beam arriving on point P2 undergoes diffused reflection, and a part of this beam undergoes a third reflection on the object 18 at a point P3 which is slightly removed from the point P1, and focuses at a point Q2 on the detector member 9 indicating that it is located further away.

In effect, the 3rd-order reflection beam 16 appears as though it is reflected from a point P'2 located on a fictitious plane 20 in such a way that the distance P1 to P2' is the same as the distance P1 to P2, and naturally, the light spot on the detector member 9 indicates that P'2 is further away by a distance equal to P1 to P'2.

In general, therefore, when a 3rd-order reflection is generated, the center of gravity of the luminous energy seen by the detector member 9 is biased in the direction of longer distance. In other words, the center of brightness appears falsely further.

To remove the influence of 3rd-order multiple reflection, it is necessary to obtain the focal position of the simple refection beam 7.

Figure 20:
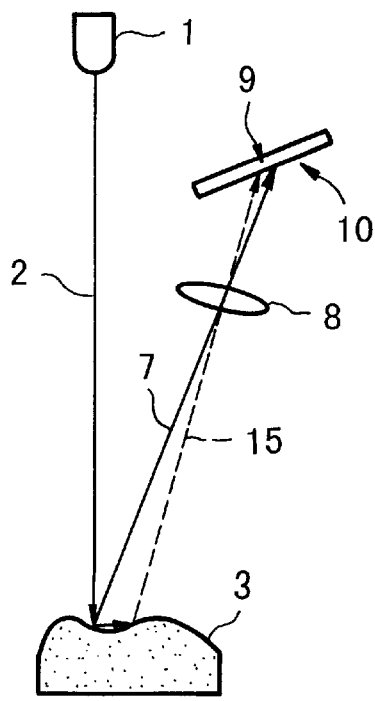
FIG. 20 is an illustration of a case of 2nd-order multiple reflection.
Figure 21:
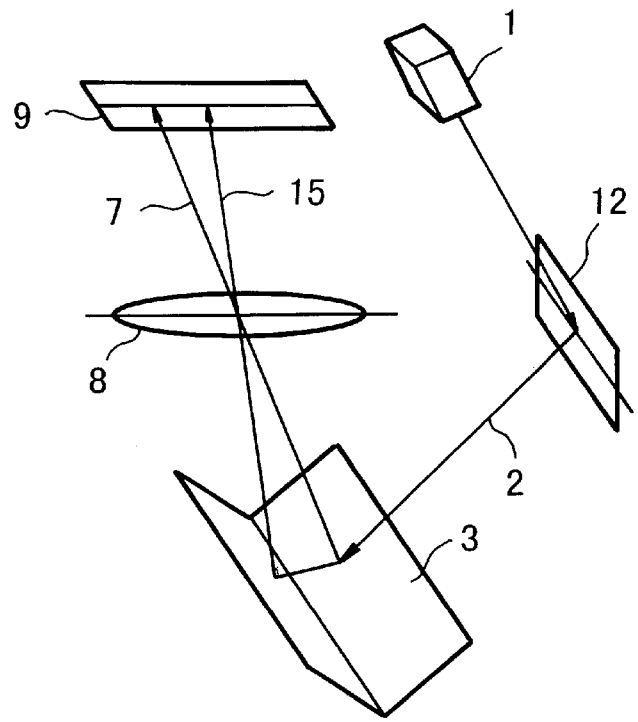
FIG. 21 is an illustration of an example of an L-shaped object as an example of objects susceptible to generating multiple reflections.
Figure 22:
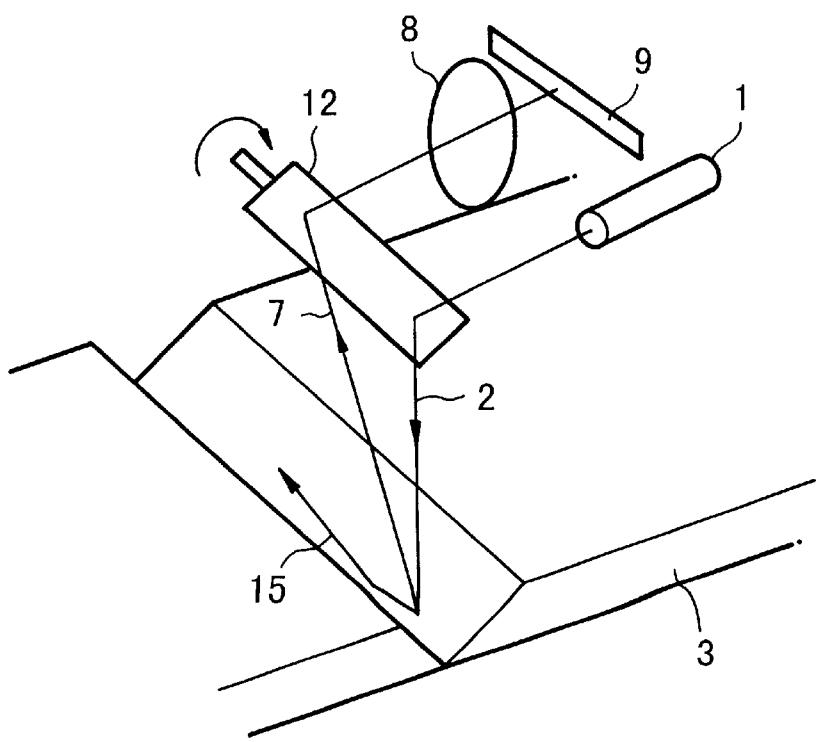
FIG. 22 is an illustration of an arrangement of optical components when the object is L-shaped.

If a remedial step is taken for the 3rd-order reflection (beam 15 in FIG. 20), because the influence from multiple reflections higher than 4th-order is negligible, the spot focused by the simple reflection beam 7 will always be closer than the light spot focused by the 3rd-order reflection, so that a light spot corresponding to the shortest distance to the object can be the correct light spot.

Figure 6:
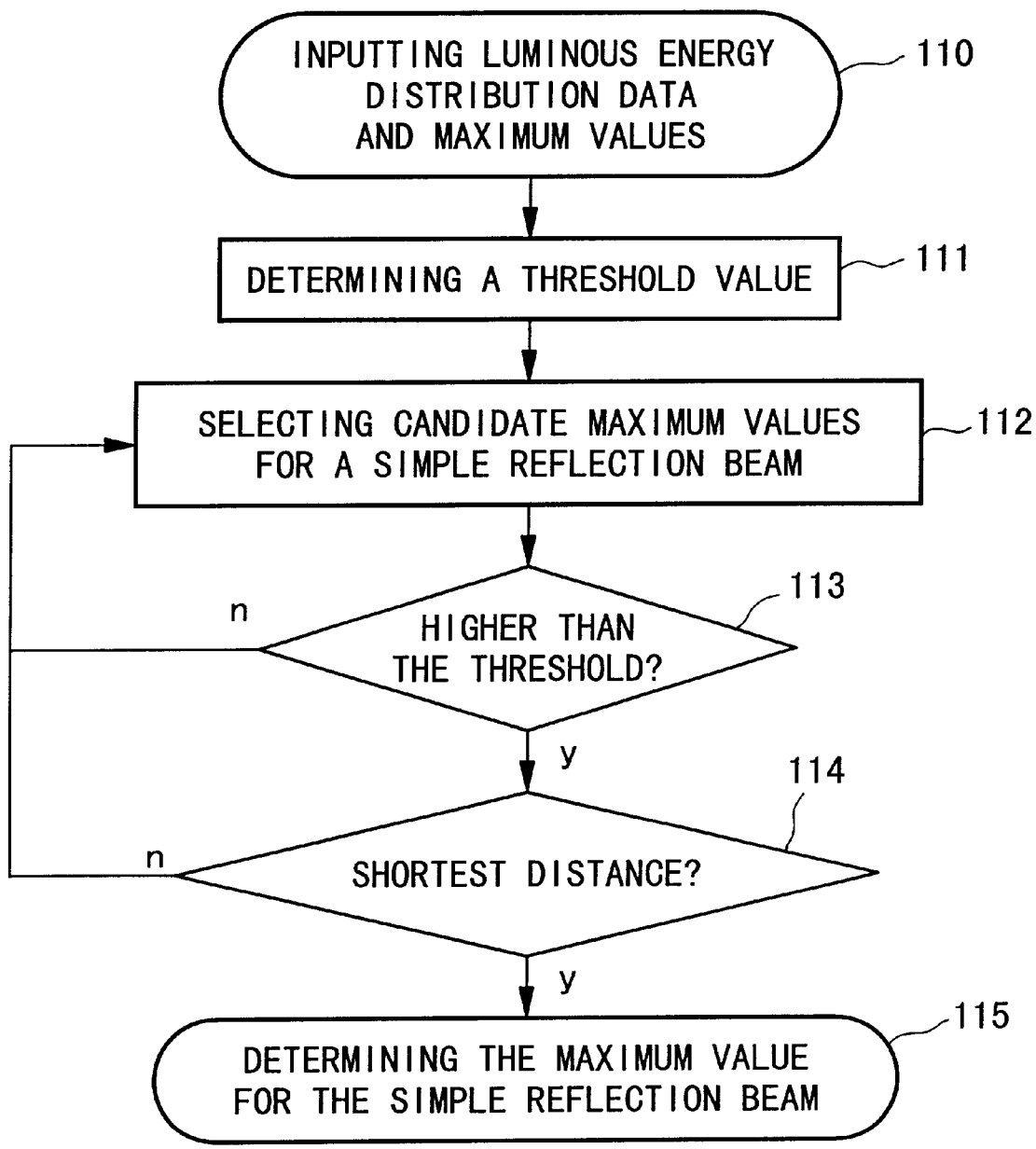
FIG. 6 is a flowchart showing the processing steps in the spot selection section.

FIG. 6 is a flowchart of the processing steps performed in the spot selection section 31.

When the energy distribution data from each light spot obtained in the spot separation section 30 is input into the spot selection section 31 (step 110), a threshold value to be used as a criterion for the maximum values (step 111) is determined, and the maximum values obtained in the spot separation section 30 are selected as candidate values for the simple reflection beam 7 (step 112), and these values are examined for the requirement to exceed the threshold value (step 113).

In step 113, if a maximum value is greater than the threshold value, the position of that maximum value is examined for another requirement to be the shortest distance to the object (right-side on the detector 9) (step 114), and the maximum value indicating the shortest distance (farthest on the right-side of the detector 9) is selected as the correct maximum for the simple reflection beam 7 (step 115).

In more detail, when a plurality of maximum values are input into the spot selection section 31, it selects one maximum value (step 113) if it is higher than the threshold value (selected in step 110 to remove noise) and corresponds to the shortest distance to the object (step 114). The selected value is designated as the maximum luminosity for the simple reflection beam 7.

In the present example shown in FIG. 3, coordinates for the light spot due to the simple reflection beam 7 are given by $p_{MAX2}$ ($x_{MAX2}$, $y_{MAX2}$).

The inflection points $p_{IF3}$, $p_{IF4}$ of the distribution curve are assumed to be the dividing points (positions separating each light spot) and the distribution data are divided at the inflection points to delete all the distribution data other than those lying inside the range given by the inflection points $p_{IF3}$~$p_{IF4}$. This process reduces the uncertainty in choosing the correct light spot, caused by the influence of luminosity of the multiple reflection beam in affecting the position of peak luminosity for the correct light spot due to the simple reflection beam 7.

On the other hand, if the luminosity peaks are close together, the minimum value $p_{MIN2}$ ($x_{MIN2}$, $y_{MIN2}$), rather than the inflection point $p_{IF3}$, become closer to the peak values $p_{MAX2}$ ($x_{MAX2}$, $y_{MAX2}$). In such a case, the energy distribution data are divided using the minimum values $p_{MIN2}$ ($x_{MIN2}$, $y_{MIN2}$) so as to attribute respective luminosity to individual light spots.

Figure 24:
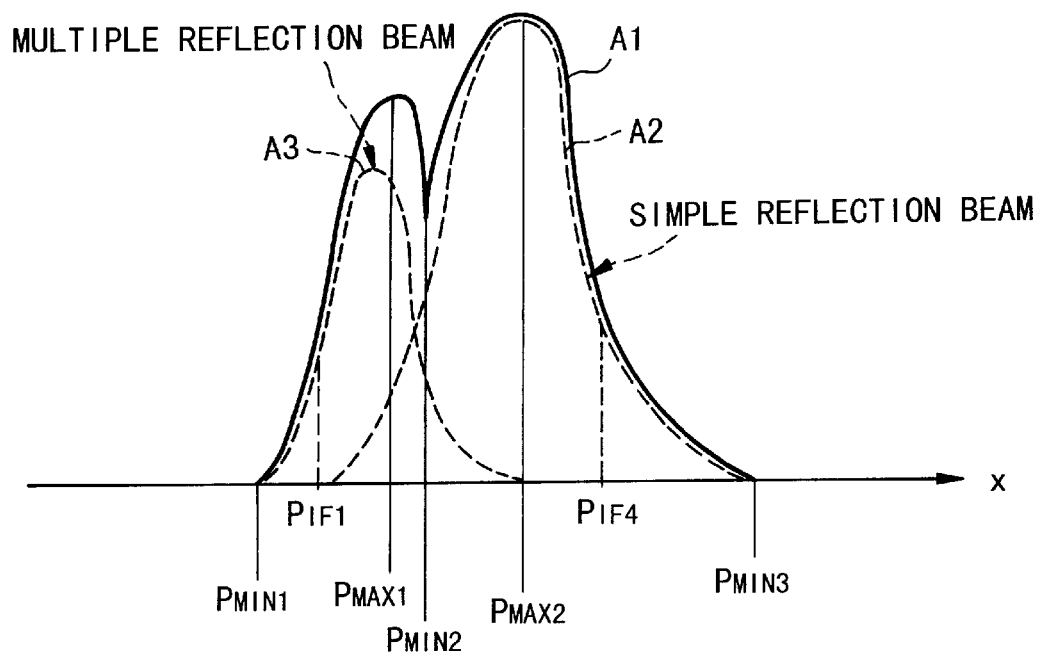
FIG. 24 is an illustration of superposition of light spots, creased by a simple refection beam and a 3rd-order reflection beam, overlapping their respective inflection points.
Figure 25:
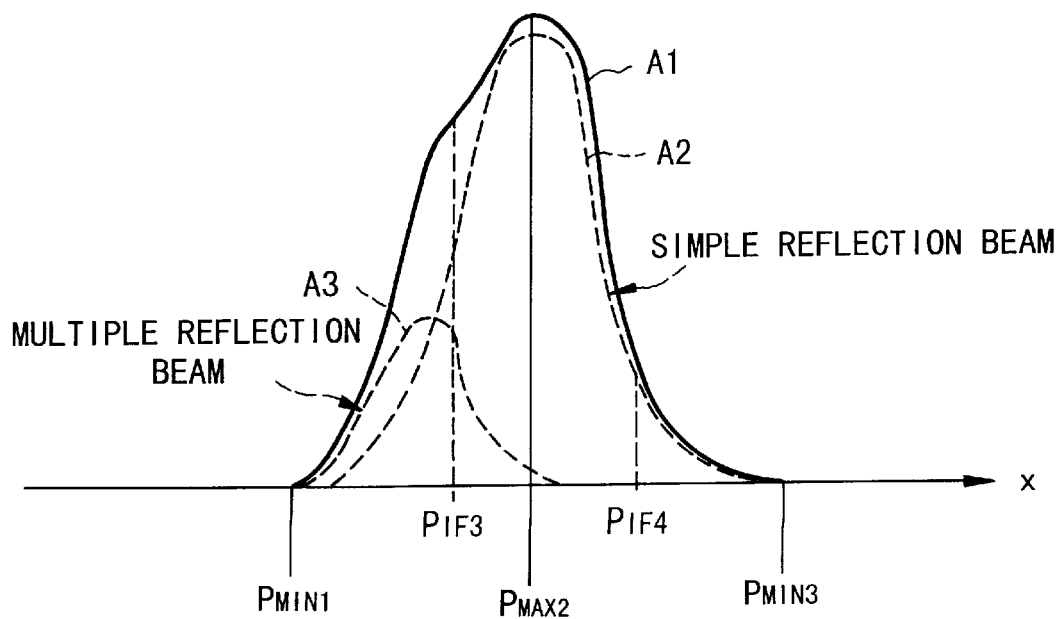
FIG. 25 is an illustration n of nearly complete superposition of light spots formed by a simple reflection beam and a multiple reflection beam.

This will be explained in more detail with reference to FIGS. 3, 24 and 25. If the superposition of the multiple reflection curve and the simple reflection curve is only partial as illustrated in FIG. 3, the spot selection section 31 designates the region bounded by the inflection point $p_{IF3}$ (on the left of $p_{MAX2}$) and the inflection point $p_{IF4}$ (on the right of $p_{MAX2}$) to be the luminosity value for the simple reflection beam 7. On the other hand, if the two curves are superimposed such as to hide the respective inflection points, as illustrated in FIG. 24, then the spot selection section 31 selects the luminosity value for the simple reflection beam 7 to be the region bounded by the minimum value $p_{MIN2}$ (on the left of $p_{MAX2}$) and the inflection point $p_{IF4}$ (on the right of $p_{MAX2}$). Lastly, when the two curves are almost totally superimposed upon each other, as illustrated in FIG. 25, then the spot selection section 31 selects the energy field for the simple reflection beam 7 to be the region bounded by the inflection point $p_{IF3}$ (on the left of $p_{MAX2}$) and the inflection point $p_{IF4}$ (on the right of $p_{MAX2}$).

In other words, luminosity of each light spot is attributed in such a way that those extreme values and inflection points which are closest to the selected maximum value define the boundary points for separating into individual light spots.

It should be noted that the reason for deciding a threshold value for the maximum values in step 111 is that, unless there is a certain minimum luminosity for each light spot, precision measurements cannot be obtained so that, after adjusting the apparatus sensitivity, it is necessary to repeat the measurements regardless of the effects of multiple reflections.

The maximum value together with the left and right inflection points of the simple reflection curve 7 are input into the luminosity distribution restoration section 32.

[Luminosity Distribution Restoration Section 32]

Although the spot selection section 31 defines a proper range of luminosity for the simple reflection curve, but the deletion of extraneous parts of the curve created by the 3rd-order reflection beam 16 also removes a part of the legitimate luminosity belonging to the simple reflection beam 7.

Therefore, the luminosity distribution restoration section 32 restores the proper luminosity for the simple reflection beam 7, which has been lost by deleting the energy contributed by the 3rd-order reflection beam 16. This computational step is performed by using some type of single-peak distribution function, for example a least-square curve, to approximate the lost portions of the curve.

Figure 7:
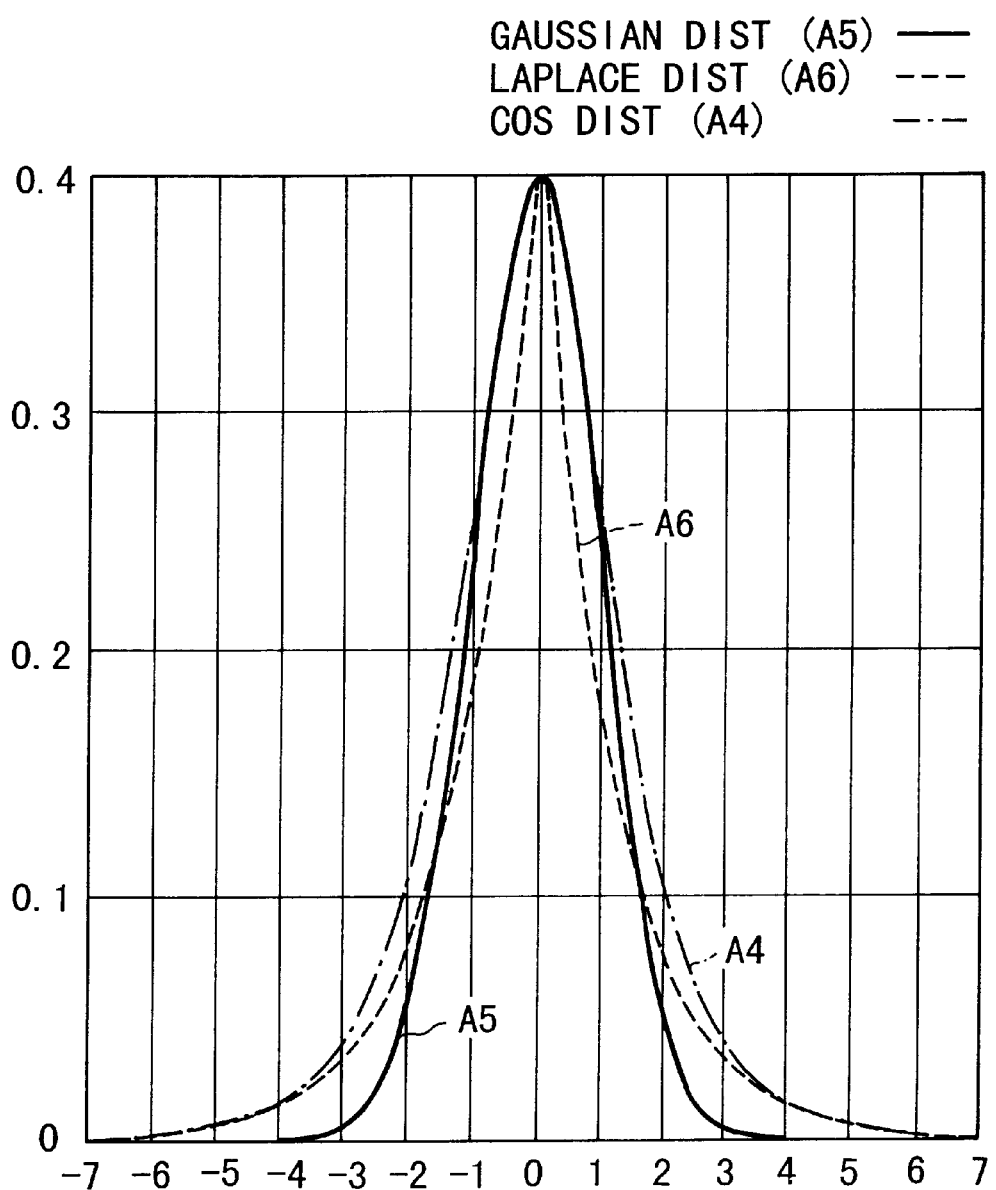
FIG. 7 is a graph showing different forms of distribution function for restoring luminosity of a simple reflection beam in the input energy distribution restoration section.

In this example, the curve shape is approximated using a cosine distribution function shown in FIG. 7 (A4 in FIG. 7). The maximum value of the luminosity curve for beam 7 is substituted in the cosine distribution function to restore the proper shape of the distribution curve.

Using a similar technique, curve shape for all other light spots can be restored using some type of single-peak distribution function.

In this case, the total luminosity is the sum of the original luminosity bounded by the left and right inflection points ($p_{IF3}$~$p_{IF4}$) and the energy contributions given by $p_{IF3}$ to the left tail-off portion and $p_{IF4}$ to the right tail-off portion of the restored curve.

Luminosity value may also be taken to be the total area under a curve given by a single-peak distribution function chosen to represent the luminosity curve.

By following such methods, a correct luminosity curve for the simple reflection beam 7, having negligible interference from the 3rd-order refection beam 16, can be obtained.

Luminosity data of simple reflection beam 7 obtained by the luminosity distribution restoration section 32 are input into the focal position detection section 33.

[Focal Position Detection Section 33]

Focal position detection section 33 computes a weighted average position for the simple reflection beam 7 according to the luminosity data obtained.

The focal position for beam 7 obtained by the focal position detection section 33 is input into the distance computation section 34.

[Distance Computation Section 34]

Distance computation section 34 determines the distance by using the focal position of beam 7 using the triangulation principle.

Summarizing the method presented in Embodiment 1, a precise distance to an object susceptible to generating multiple reflections, because of their shapes or glossy surface, can be derived by analytically separating the 3rd-order reflection beam from the simple reflection beam.

Embodiment 2

The distance measuring apparatus in Embodiment 2 applies a normal distribution function shown in FIG. 7 (A5 in FIG. 7), instead of the cosine distribution function used in Embodiment 1, to restore the luminosity curve for the simple reflection beam 7 in the luminosity distribution restoration section 32. The average value in the function is correlated with the maximum value in the luminosity curve for the simple reflection beam 7, and the standard deviations in the function are correlated with the inflection points of the luminosity curve for the simple reflection beam 7.

Figure 8:
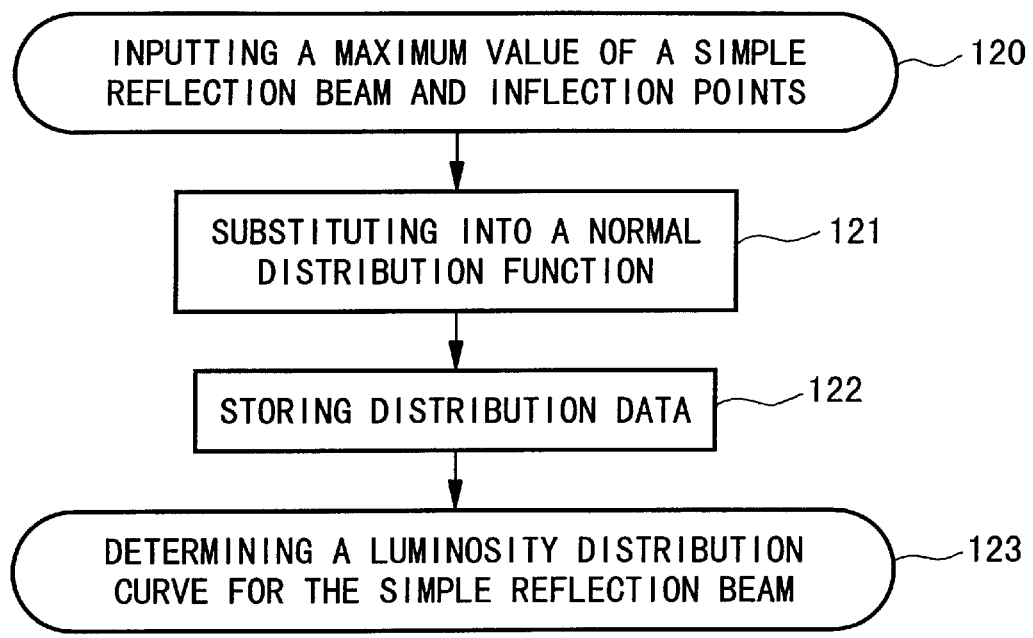
FIG. 8 is a flowchart showing the steps for restoring luminosity in the luminosity distribution restoration section in a second embodiment.

FIG. 8 shows the processing steps in the luminosity distribution restoration section 32.

The maximum value of the simple reflection beam 7 and the inflection points obtained in the spot selection section 31 are input into the luminosity distribution restoration section 32 (step 120), and the maximum value and the inflection points are then substituted in the normal distribution function (step 121).

The luminosity data obtained in step 121 are stored (step 122), and luminosity curve for the simple reflection beam 7 is obtained (step 123).

By using the normal distribution function which more closely approximates the energy distribution of the laser light than the cosine distribution function, more accurate luminosity distribution restoration is possible.

In this embodiment, because the weighted average position of the luminosity of beam 7 is equal to the maximum value of beam 7, the maxim value can be used in obtaining the focal position of beam 7 in the focal position detection section 33.

Embodiment 3

The distance measuring apparatus in Embodiment 3 applies a Laplace distribution function shown in FIG. 7 (A6 in FIG. 7), instead of the cosine distribution function used in Embodiment 1, to restore the luminosity curve for the simple reflection beam 7 in the luminosity distribution restoration section 32. The average value in the function is correlated with the maximum value in the luminosity curve for the simple reflection beam 7, and the standard deviations in the function are correlated with the inflection points of the luminosity curve for the simple reflection beam 7.

It should be noted that in each of the embodiments (1~3) presented so far, it is acceptable to use any distribution function in the restoration process performed in the luminosity distribution restoration section 32, so long as the maximum value of the luminosity curve for beam 7 correlates with the average value in the function, and the inflection points for beam 7 correlate with the standard deviations in the function.

By choosing a distribution function to closely approximate the energy distribution pattern of a laser beam used in the laser range sensor, even more accurate restoration of the individual luminosity can be performed.

Embodiment 4

Figure 9:
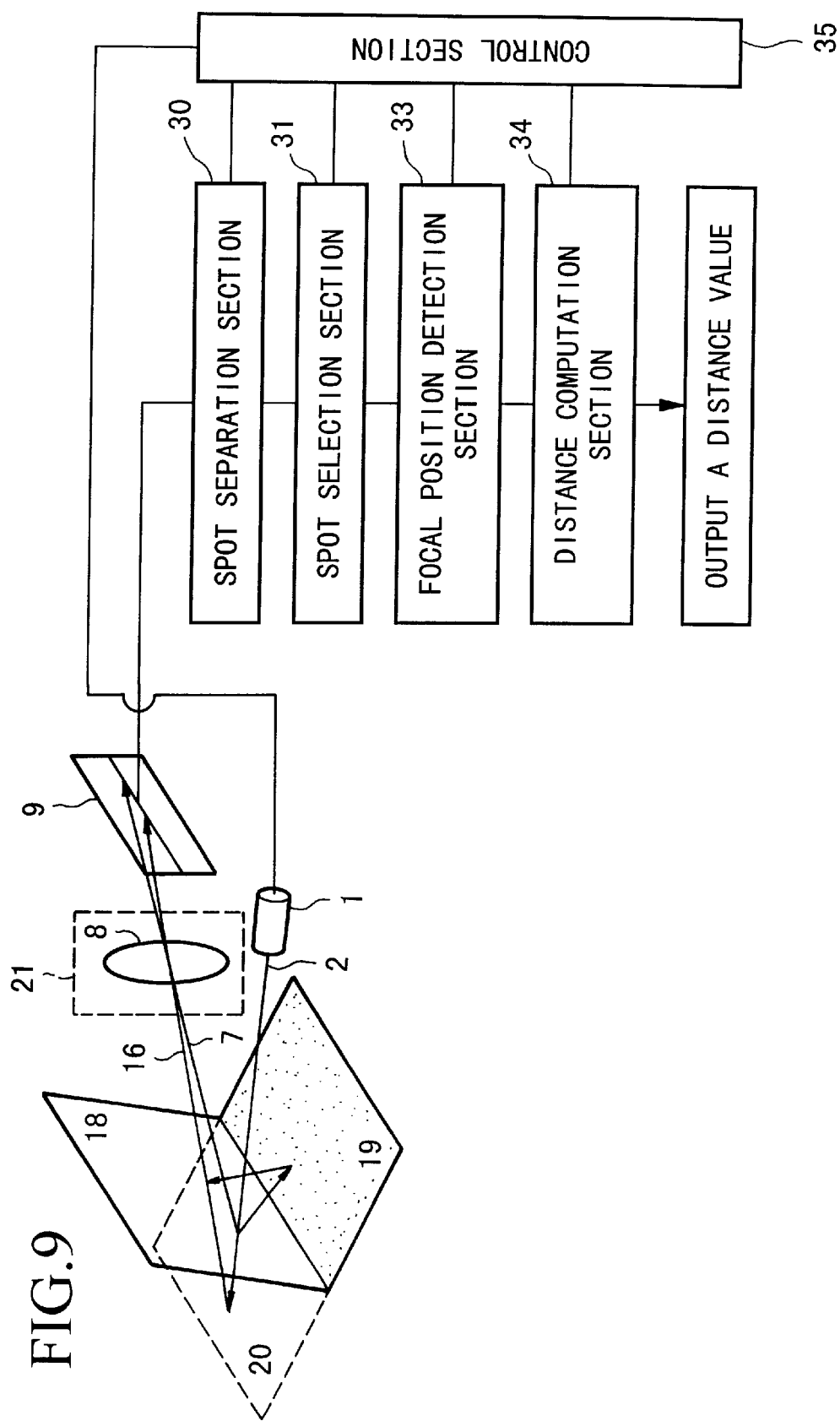
FIG. 9 is a schematic diagram of a fourth embodiment of the distance measuring apparatus.

FIG. 9 shows a schematic arrangement of the distance measuring apparatus used in Embodiment 4.

The apparatus in Embodiment 4 differs from that in Embodiment 1 by the absence of the luminosity distribution restoration section 32.

That is, in the present embodiment, without performing the restoration process for the simple reflection beam 7, the focal position is assumed to be the maximum value or the center value of the luminosity curve for beam 7 obtained in spot selection section 31.

According to this method, because there is no need to restore the luminosity curve and to compute weighting for the average position of the curve, focal position of the simple reflection beam 7 can be obtained more quickly.

Embodiment 5

Figure 10:
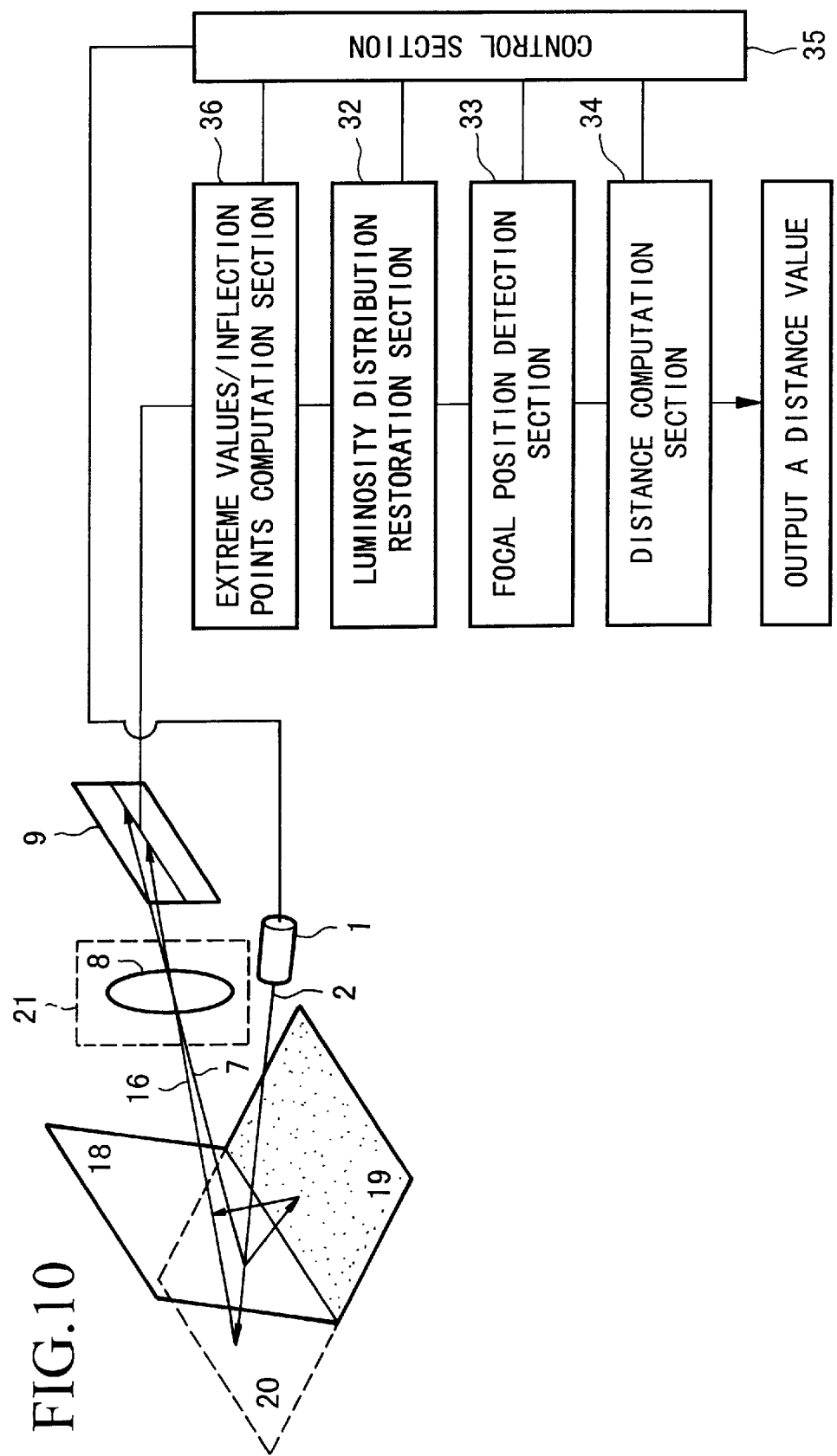
FIG. 10 is a schematic diagram of a fifth embodiment of the distance measuring apparatus.

FIG. 10 shows a schematic arrangement of the distance measuring apparatus used in Embodiment 5.

The present apparatus differs from that in Embodiment 1 in that the spot separation section 30 and the spot selection section 31 are replaced with an extreme values/inflection points computation section 36.

When the energy distribution data obtained by the detector member 9 relates only to simple reflection beam 7 and does not include the 3rd-order reflection beam 16, the spot separation section 30 and the spot selection section 31 are not necessary.

The distance measuring apparatus in this embodiment receives only simple reflection beam and does not receive 3rd-order reflection beam in the detector member 9. Therefore, the extreme values/inflection points computation section 36 simply produces maximum values of the coordinates $p_{MAX1}$ ($x_{MAX1}$, $y_{MAX1}$) from the first derivatives, and obtains inflection points $p_{IF3}$, $p_{IF4}$ in the energy distribution curve from the second derivatives.

Using the values of the maximum and inflection points, the luminosity distribution restoration section 32 restores the luminosity curve by following a process similar to the process of restoring the luminosity curve when the 3rd-order reflection beam 16 is included.

In this case, the restored distribution curve closely approximates the original distribution curve so that there is no effect of restoration on measurement error.

Accordingly, the apparatus of this embodiment is applicable when the reflected beams contain only the simple reflection beam 7 and has no contribution from the 3rd-order reflection beam 16 so that restoration of the energy distribution curve and focal position of the light spot can be carried out efficiently and accurately.

Embodiment 6

The arrangement of the distance measuring apparatus in this embodiment is the same as that in Embodiment 1.

The method of calculating the distance is different, and the computational steps will be explained using the energy distribution curve produced by the detector member 9 shown in FIG. 3.

In this embodiment also, differentiation is performed by the spot separation section 30 on the energy distribution curve produced by the detector member 9. The steps are the same as those explained in FIG. 4 and detailed explanations will be omitted.

As in Embodiment 1, the first derivatives provide for the extreme values and their coordinates.

In this embodiment, the maximum values are $p_{MAX1}$ ($x_{MAX1}$, $y_{MAX1}$) and $p_{MAX2}$ ($x_{MAX2}$, $y_{MAX2}$), and the minimum values are $p_{MIN1}$ ($x_{MIN1}$, $y_{MIN1}$), $p_{MIN2}$ ($x_{MIN2}$, $y_{MIN2}$), and $p_{MIN3}$ ($x_{MIN3}$, $y_{MIN3}$).

Also, from the second derivatives, inflection points $p_{IF1}$, $p_{IF2}$, $p_{IF3}$, $p_{IF4}$ are obtained.

Next, as in Embodiment 1, the spot separation section 30 separates each light spot at the minimum values $p_{MIN2}$ ($x_{MIN2}$, $y_{MIN2}$).

Next, as in Embodiment 1, the spot selection section 31 compares the peak values within each light spot with the threshold value, and selects the maximum value which exceeds the threshold value and showing the shortest distance to the object (right-side of detector 9) to be the maximum value for the simple refection beam 7.

The steps taken in the spot selection section 31 are the same as the one shown in FIG. 4, and detailed explanations will be omitted.

In this embodiment, $p_{MAX2}$ ($x_{MAX2}$, $y_{MAX2}$) is designated to be the maximum value for the simple reflection beam 7.

Also, the inflection points $p_{IF3}$, $p_{IF4}$ are used as the separation points (dividing position for each light spot), and the curve is separated at the separation points so that all the data outside of the range $p_{IF3}$~$p_{IF4}$ are deleted to reduce the effects of multiple reflection.

When the peak position are close together, the minimum value $p_{MIN2}$ ($x_{MIN2}$, $y_{MIN2}$) rather than the inflection point $p_{IF3}$ becomes closer to $p_{MAX2}$ ($x_{MAX2}$, $y_{MAX2}$), therefore, in such a case, the minimum value $p_{MIN2}$ ($x_{MIN2}$, $y_{MIN2}$) is used as the separation point to divide the luminous energy distribution curve into individual light spots.

This will be explained in more detail with reference to FIGS. 3, 24 and 25. If the superposition of the multiple reflection curve and the simple reflection curve is only partial as illustrated in FIG. 3, the spot selection section 31 designates the region bounded by the inflection point $p_{IF3}$ (on the left of $p_{MAX2}$) and the inflection point $p_{IF4}$ (on the right of $p_{MAX2}$) to be the luminosity for the simple reflection beam 7. On the other hand, if the two curves are superimposed such as to hide the respective inflection points, as illustrated in FIG. 24, then the spot selection section 31 selects the luminosity for the simple reflection beam 7 to be the region bounded by the minimum value $p_{MIN2}$ (on the left of $p_{MAX2}$) and the inflection point $p_{IF4}$ (on the right of $p_{MAX2}$). Finally, when the two curves are almost totally superimposed upon each other, as illustrated in FIG. 25, then the spot selection section 31 selects the luminosity for the simple reflection beam 7 to be the region bounded by the inflection point $p_{IF3}$ (on the left of $p_{MAX2}$) and the inflection point $p_{IF4}$ (on the right of $p_{MAX2}$).

In other words, energy distribution of each light spot is attributed in such a way that those extreme values and inflection points which are closest to the maximum value define the boundary points for separating the light spots.

Although the spot selection section 31 selects the energy distribution for the simple reflection beam 7, deletion of the energy contribution made by the 3rd-order reflection beam 16 also deletes a portion of the energy contributed by beam 7.

Therefore, the luminosity distribution restoration section 32 restores the lost portion of the curve using the normal distribution function or other distribution function to approximate the original curve closely.

In this case, the maximum value $p_{MAX2}$ ($x_{MAX2}$, $y_{MAX2}$) for the simple reflection beam 7 corresponds to the maximum value (average) for the normal distribution function (A5 in FIG. 7) and the inflection points $p_{IF3}$ ($x_{IF3}$, $y_{IF3}$), $p_{IF4}$ ($x_{IF4}$, $y_{IF4}$) correspond to the standard deviations in the normal distribution function.

From these considerations, by substituting the maximum value of the luminosity curve and the inflection points for beam 7 into the normal distribution function, the original luminosity curve for beam 7 can be restored.

Examination of the luminosity curve for beam 7 shows that the curve is somewhat distorted showing asymmetry in the left/right halves (refer to σL and σR in FIG. 3). Therefore, the left and right standard deviations should be different, and the raw data cannot be directly substituted in the normal distribution function.

Therefore, the present method of luminosity distribution restoration relies on computing the left and right halves of the curve separately using different values for the standard deviation in the normal distribution function, and pasting the restored half-curves together at their common maximum value.

Figure 11:
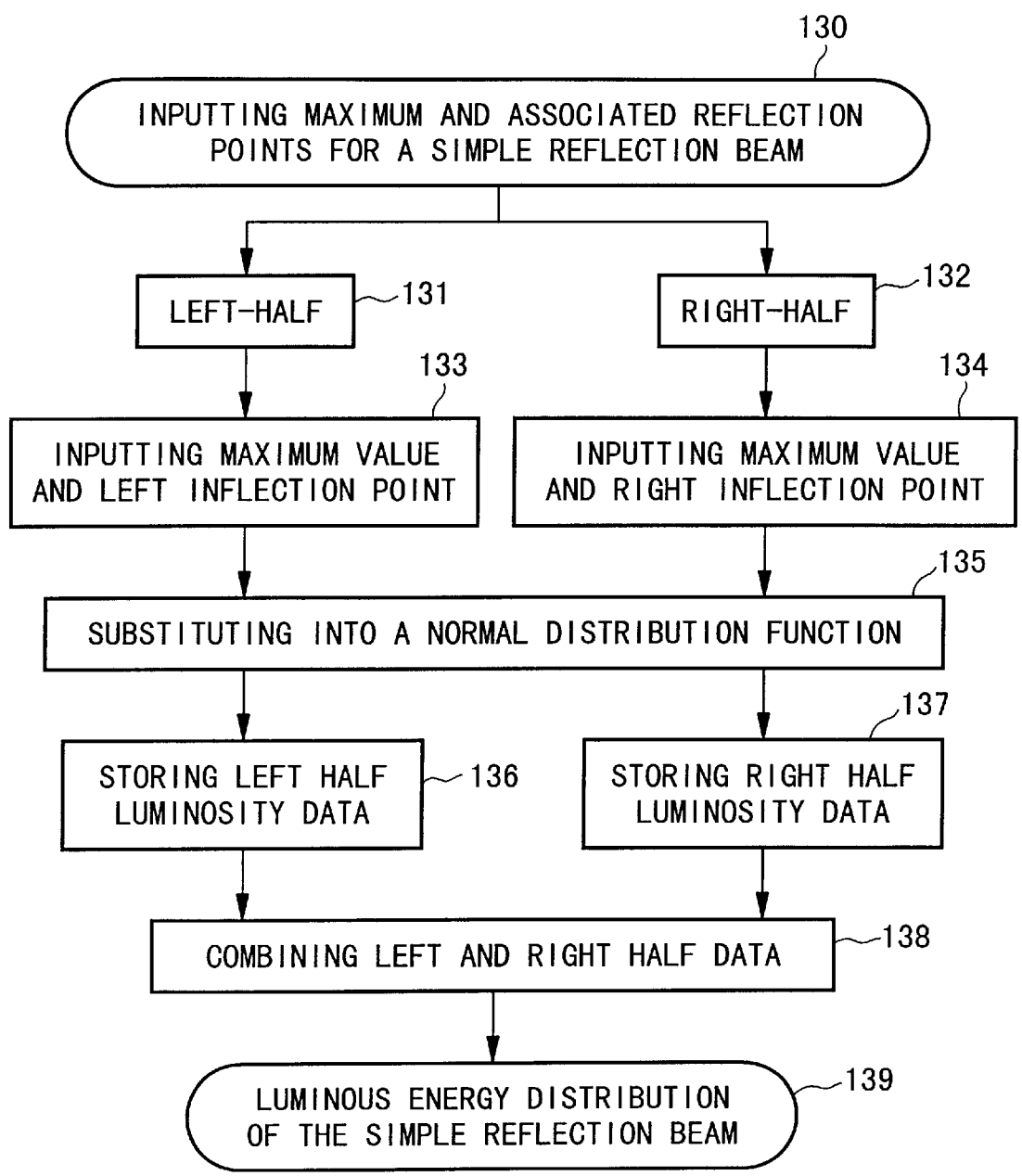
FIG. 11 is a flowchart showing the steps for restoring luminosity in the luminosity distribution restoration section in a sixth embodiment.

FIG. 11 is a flowchart showing the processing steps in the luminosity distribution restoration section 32.

When the maximum value and the inflection points for the simple reflection beam 7 obtained in the spot selection section 31 are input into the restoration section 32 (step 130), the inflection points are separated into a left-half inflection point and a right-half inflection point (steps 131, 132), and the maximum value and the left-side inflection point for beam 7 (step 133) are obtained.

Similarly, the maximum value and the right-side inflection point for beam 7 are obtained (step 134). The maximum value and the left-side inflection point are substituted in the normal distribution function (step 135), and the left-half curve of the maximum value is stored (step 136).

Similarly, the maximum value and the right-half inflection point are substituted in the distribution function (step 135), and the right-half curve of the maximum value is stored (step 137).

The left-half and right-half curves obtained in steps 136, 137 are joined (step 138) to generate a luminosity curve for the simple reflection beam 7 (step 139).

Figure 12:
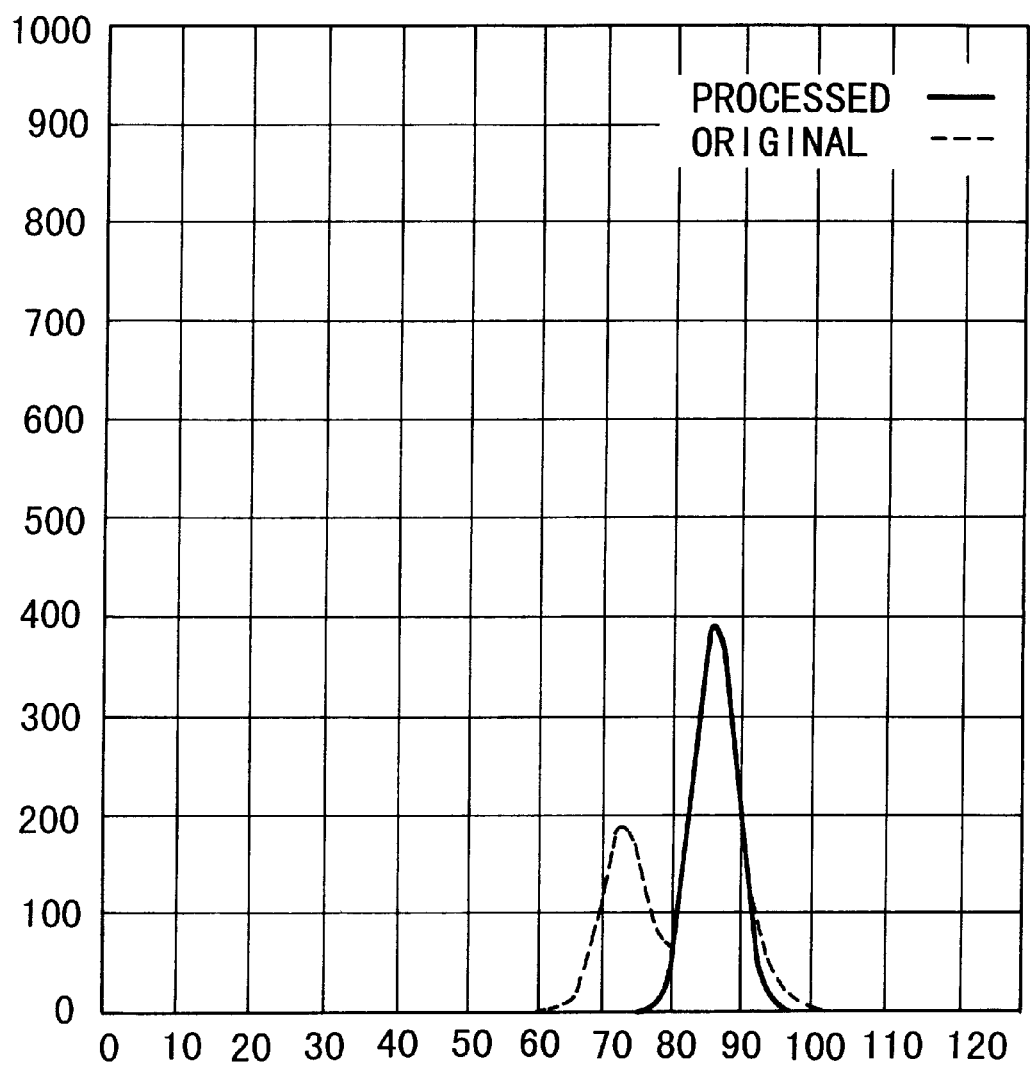
FIG. 12 is a graph showing the results of actual processing of a 3rd-order reflection beam in the sixth embodiment.

FIG. 12 shows an actual example of the results of processing the energy distribution data, including the 3rd-order multiple reflection, according to the present method. In FIG. 12, the dotted line relates to the original unprocessed data, and the solid line relates to the processed data.

Accordingly, the present method provides a precision result for the simple reflection beam 7 that is not adversely affected by the 3rd-order reflection beam 16.

Next, a weighted average position is computed in the focal position detection section 33 based on the energy distribution curve for beam 7 to find the focal position for beam 7.

Finally, the distance measuring section 34 calculates the distance to the measuring object by triangulation using the focal position obtained for beam 7.

It is acceptable to eliminate the luminosity distribution restoration section 32, as in Embodiment 4, i.e., without restoring the energy distribution curve for beam 7, and to assume that the maximum value or the center value of the energy distribution curve for beam 7 obtained in the spot selection section 31 represents the focal position.

In this case, there is no need to compute the weighted average position so that the focal position can be obtained more quickly.

Further, if the luminous energy distribution on the detector member 9 is caused only by beam 7 and does not contain contribution from beam 16, then, as in Embodiment 5, the spot separation section 30 and the spot selection section 31 can be eliminated, and the extreme values/inflection points computation section 36 may be provided instead.

In this case, the extreme values/inflection points computation section 36 simply obtains the maximum point $p_{MAX1}$ ($x_{MAX1}$, $y_{MAX1}$) by first differentiation and obtains only the inflection points $p_{IF3}$, $p_{IF4}$ by second differentiation.

The luminosity distribution restoration section 32 restores the luminosity curve using the values of the maximum and inflection points, in the same way as the method to include the 3rd-order multiple reflection 16.

In this case, the restored luminosity curve closely approximates the original luminosity curve so that there is no effect of restoration on measurement error.

Embodiment 7

The distance measuring apparatus of Embodiment 7 restores the luminosity of simple reflection beam 7 by applying Laplace distribution function shown in FIG. 7 (A6 in FIG. 7), instead of the cosine distribution function used in Embodiment 6, in the luminosity distribution restoration section 32, where the average value of the function curve is correlated with the maximum value in the luminosity curve for the simple reflection beam 7, and the standard deviations of the function curve is correlated with the inflection points of the luminosity curve for the simple reflection beam 7.

It should be noted that in Embodiments 6 or 7, any distribution function is acceptable so long as the restoration process performed in the luminosity distribution restoration section 32 can correlate the maximum value of the luminosity curve for beam 7 with the average value of the function, and the inflection points with the standard deviations of the function.

By choosing a distribution function to closely approximate the energy distribution pattern of a laser beam used in the range sensor, even more accurate restoration of the luminosity can be performed.

Embodiment 8

Figure 13:
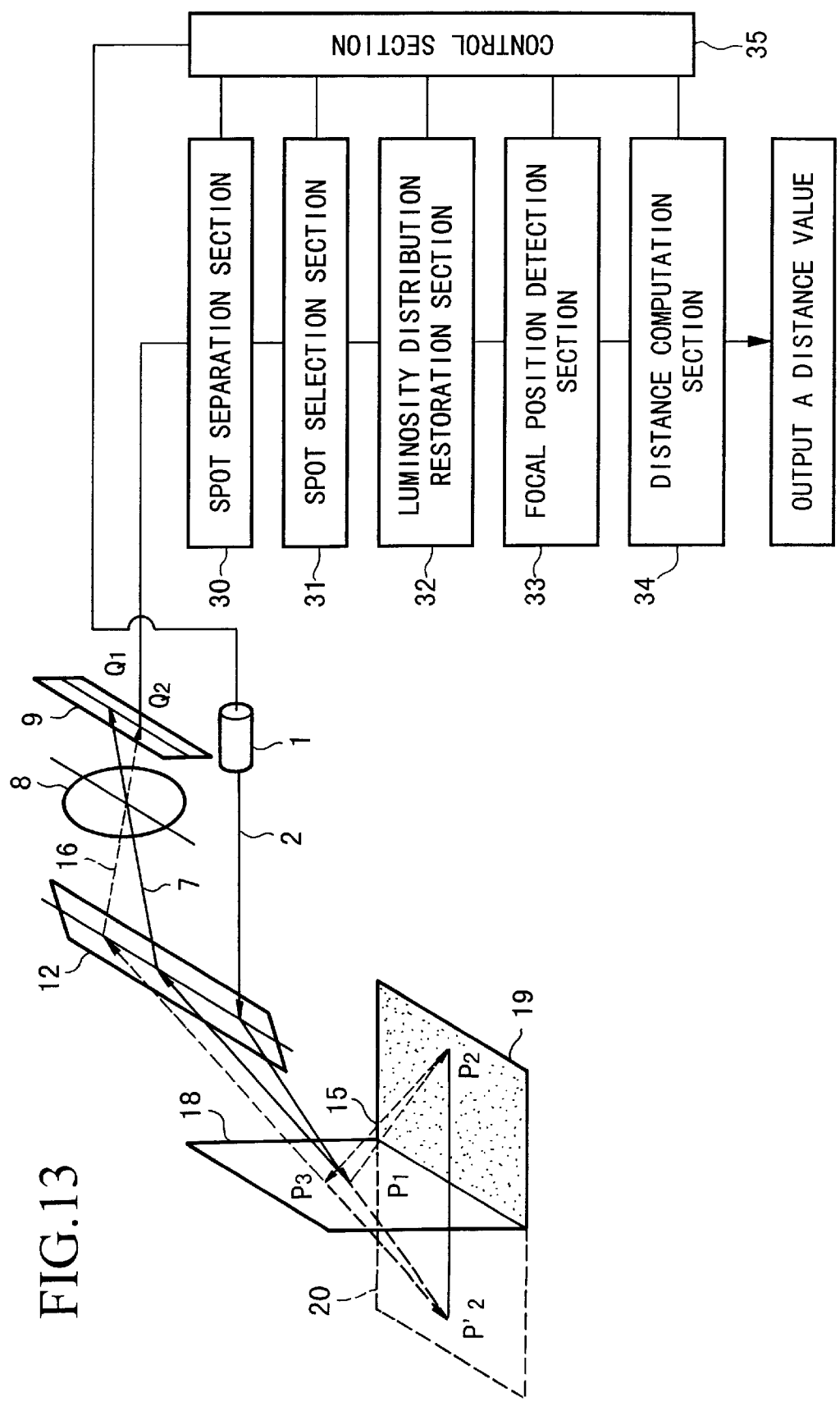
FIG. 13 is a schematic diagram of a distance measuring apparatus in an eighth embodiment.

FIG. 13 shows an arrangement of the distance measuring apparatus.

The apparatus in this embodiment shows an application of the present invention to a synchronized scanning range finder.

A light beam (laser beam) 2 emitted from a light source 1 is reflected by a scanner mirror 12, and after reflecting from a point P1 on a glossy object 18, a portion of the beam is focused, through a scanner mirror 12 and an optical device (lens) 8 on a point Q1 on the detector member 9.

According to this apparatus, a 2nd-order reflection beam (15 in FIG. 20) generated from the light source 2 and reflected from the glossy object 18 does not reflect on the axial line of the scanner mirror 12. Therefore, the beam 15 does not focus on the detector member 9 so that the 2nd-order reflection is structurally diverted. However, the 3rd-order reflection beam 16 will reflect on the axial line of the scanner mirror 12 to focus on the detector member 9.

Because the 3rd-order reflection beam 16 focuses on the detector member 9, the luminous energy distribution will be different than the luminous energy distribution caused only by simple reflection beam 7, and correct distance measurement cannot be obtained.

Therefore, by applying the techniques described above for each embodiment the luminous energy distribution data obtained by the detector member 9, the effect of beam 16 can be removed so that the luminosity due only to the simple reflection beam 7 can be obtained.

Similar to Embodiment 4, the luminosity distribution restoration section 32 may be deleted so that the restoring process in this section is not performed, but the luminosity results obtained in the spot selection section 31 is used so that the maximum value or center value of the curve can be assumed to be the focal position.

Further, if the resulting luminosity is caused only by beam 7 and does not contain contribution from beam 16, then, as in Embodiment 5, the spot separation section 30 and the spot selection section 31 can be eliminated, and the extreme values/inflection points computation section 36 may be provided instead.

Embodiment 9

Figure 14:
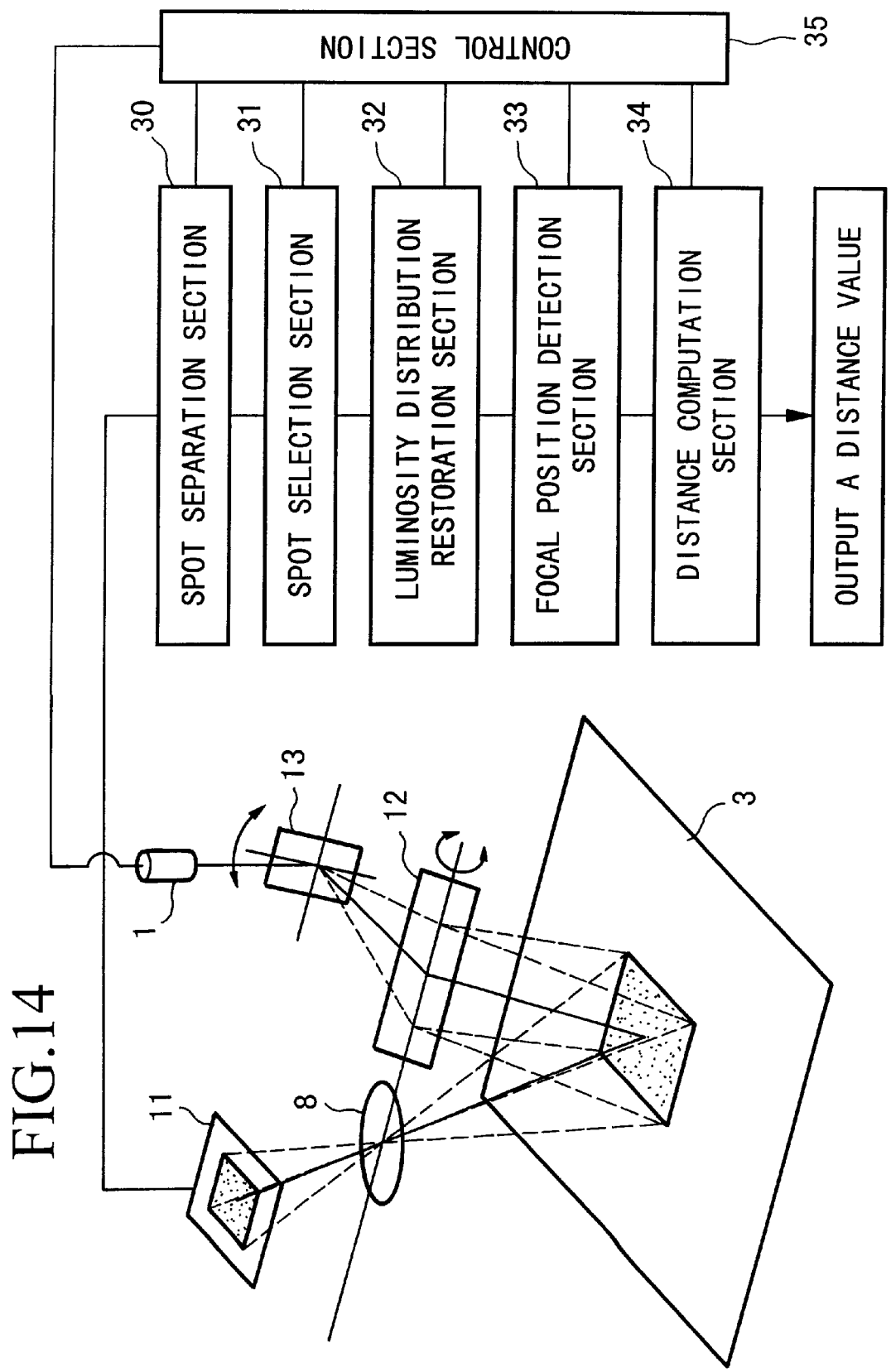
FIG. 14 is a schematic diagram of a distance measuring apparatus in a ninth embodiment.

FIG. 14 shows an arrangement of the distance measuring apparatus.

The apparatus in this embodiment shows an application of the present invention to a range sensor of two-dimensional response capability for measuring the distance.

The basic approach is to consider a case of higher than two-dimensions in the method of Embodiment 1 which uses a one-dimensional detector 9.

The following method describes the operation of a two-dimensional range sensor.

As shown in FIG. 14, two scanner mirrors 12, 13 are provided so that scanning may be performed in two-directions x- and y-directions, and the input-side is provided with a two-dimensional detector member 11 replacing the one-dimensional detector member 9.

This arrangement produces a range sensor which can measure distances in a two-dimensional space.

In this embodiment, spot separation section 30 performs differentiation steps on the luminous energy distribution surfaces obtained by the detector member 11, thereby obtaining coordinates for the maximum values and inflection points of the luminous energy distribution surface, as in Embodiment 1.

Next, as in Embodiment 1, the spot separation section 30 separates each light spot at the minimum values $p_{MIN2}$ ($x_{MIN2}$, $y_{MIN2}$).

Next, as in Embodiment 1, the spot selection section 31 selects those maximum values within each light spot which are higher than a threshold value and the shortest distance to the object (right-side of the detector member 9) are designated to be the maximum value for the simple reflection beam 7.

Next, the luminosity distribution restoration section 32 restores the luminosity surfaces using the maximum values in an n-order cosine distribution function to obtain n-order energy distribution surfaces for separate light spots.

For example, if a surface having the maximum value is chosen to represent beam 7, n-order energy distribution for beam 7 can be restored using the n-order distribution function.

Similarly, it is possible to use Laplace distribution function or normal distribution function to restore the surface for beam 7.

Also, a faster accurate method for determining the focal position is to use $p_{MAX2}$ ($x_{MAX2}$, $y_{MAX2}$).

Usually, the maximum value of luminosity for beam 7 can only be represented in whole pixel units of the detector member (9 or 11), however, by using the extreme high values, the maximum value can be defined in terms of fractional-pixel units in a CCD so that more accurate distance measurements can be performed.

Also, in this embodiment also, as in Embodiment 4, the luminosity distribution restoration section 32 may be deleted so that the restoring process is not performed in this section, but the energy distribution results obtained in the spot selection section 31 is used so that the maximum value or center value of the surface can be assumed to be the focal position.

Further, if the resulting energy distribution is caused only by beam 7 and does not contain contribution from beam 16, then, as in Embodiment 5, the spot separation section 30 and the spot selection section 31 can be eliminated, and the extreme values/inflection points computation section 36 may be provided instead.

Embodiment 10

Figure 15:
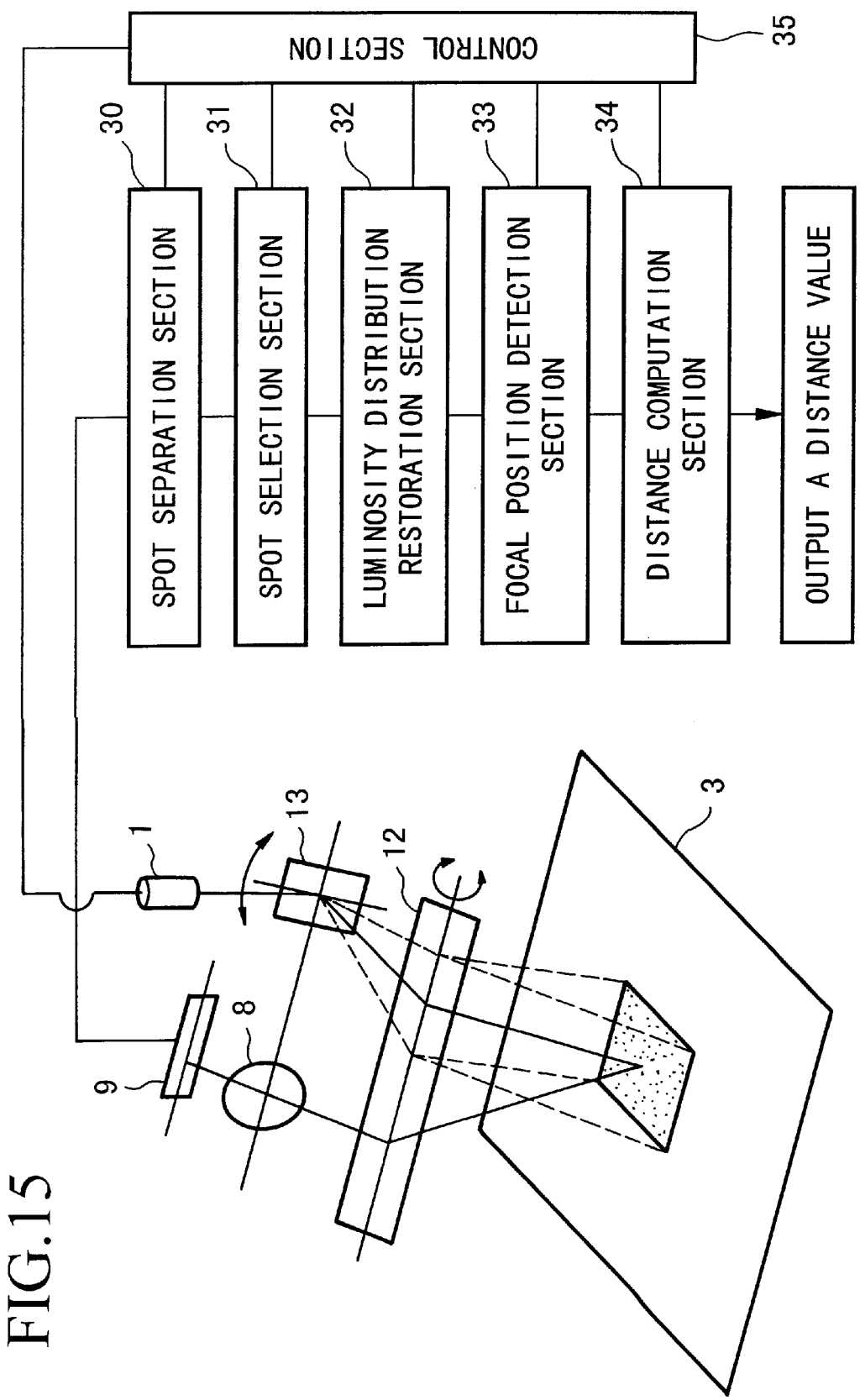
FIG. 15 is a schematic diagram of a distance measuring apparatus in a tenth embodiment.
Figure 16:
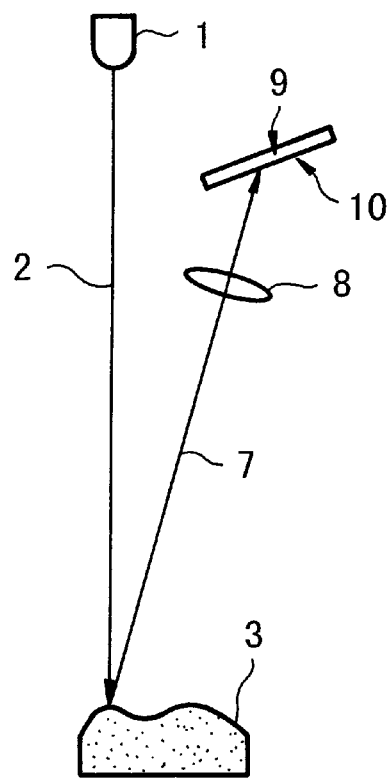
FIG. 16 is an illustration of the principle of operation of the conventional laser range sensor.
Figure 17:
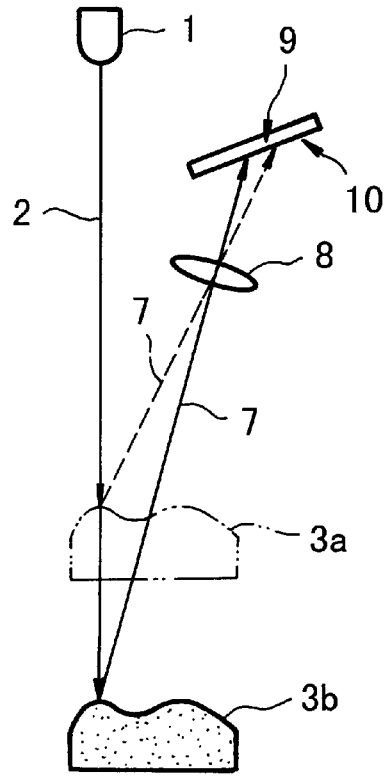
FIG. 17 is an illustration of the distance measurement based on the conventional laser range sensor.
Figure 18:
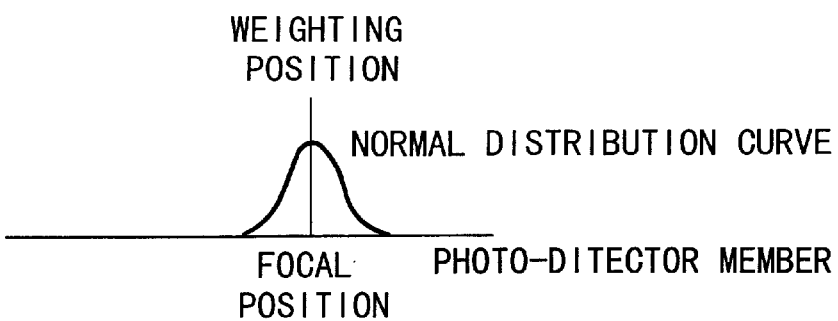
FIG. 18 is a graph showing a focal position computed from the luminous energy distribution when multiple reflection is not present.
Figure 19:
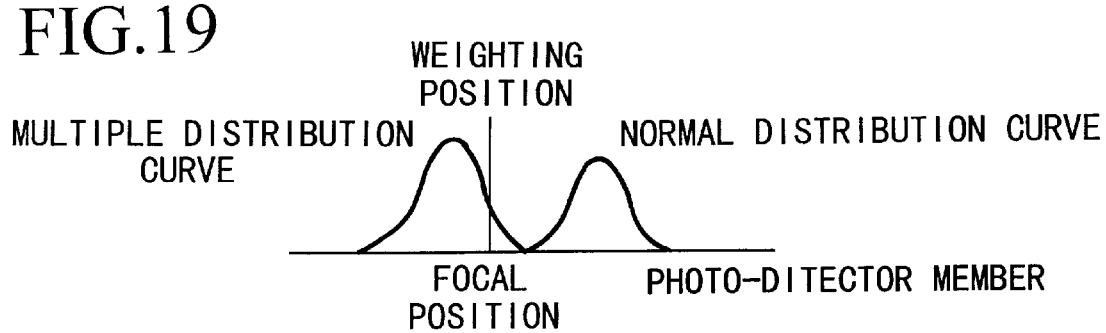
FIG. 19 is a graph showing focal positions computed from the luminous energy distribution when multiple reflection is present.

FIG. 15 shows an arrangement of the distance measuring apparatus. Two scanner mirrors 12, 13 in Embodiment 9 were used to scan in two directions, x- and y-directions, respectively, but in Embodiment 10, the beam output-portion of the mirror 12 is synchronized with the beam input-portion of the mirror 12 by extending the mirror 12 in the x-direction.

By synchronizing the beam input- and output-portions of the mirror 12, the 2nd-order reflection can be prevented from focusing on the detector member 9, as in Embodiment 6.

Also, by synchronizing the beam output-portion of the mirror 12 with the beam input-portion of the mirror 12, a one-dimensional detector member 9 can be used instead of a two-dimensional detector member 11 to scan a two-dimensional object.

It should be noted that, although the mirror 12 was made longer to act as one unit, but it is also possible to separate the output-side and input-side but to arrange so that they are driven synchronously.

Furthermore, in this case, the 3rd-order reflection beam 16 can be processed in the same way as a one-dimensional range sensor to produce the same accuracy in distance measurements.

In this embodiment also, as in Embodiment 4, the luminosity distribution restoration section 32 may be deleted so that the restoring process is not performed in this section, but the energy distribution results obtained in the spot selection section 31 is used so that the maximum value or center value of the surface can be assumed to be the focal position.

Further, if the resulting luminous energy distribution is caused only by the simple reflection beam 7 and does not contain a contribution from 3rd-order reflection beam 16, then, as in Embodiment 5, the spot separation section 30 and the spot selection section 31 can be eliminated, and the extreme values/inflection points computation section 36 may be provided instead.

It should be noted that in all the embodiments presented (excepting Embodiment 5) even when the 3rd-order reflection beam 16 is not contained in the energy distribution data, it is clear that the method of the present invention can provide accurate results in distance measurement.

It should also be noted that the processing sections (30–36) or any parts thereof shown in FIGS. 1, 2, 9, 10, 13, 14 and 15 can be operated automatically by means of a computer system for reading and executing programs recorded on some computer-readable recording medium to execute various processing steps, such as light spot separation, light spot selection, luminosity distribution restoration, focal position detection and distance computation. A computer system is meant to include operating systems and peripherals, and computer-readable recording medium is meant to include transportable medium such as floppy disk, opto-magnetic disk, ROM, CD-ROM and others as well as hard disk housed inside the computer. Computer-readable recording medium is also meant to include such short-term memory devices to operate dynamically in some network circuit (Internet, telephone circuits and the like) for sending application programs, as well as temporary memory devices such as volatile memories contained in servers and client computers in communication systems. The programs may be applicable only to a portion of the functions presented above, or they may operate in conjunction with existing programs pre-installed in the computer system.

Also, it should be noted that, when the distance measuring is to be performed in real-time, the computer system is to execute the processing steps necessary for distance determination by having the necessary components, such as beam output section and beam input section, operatively included within the system.

Also, if real-time processing is not necessary, data obtained by separate means in the beam output section and beam input section may be stored as digital data and processed later in the computer system according to the digital data supplied thereto.

Although the basic concept of the present invention was embodied in various examples presented, it is obvious that the present invention is not limited by specifics embodied in the examples, and many modifications are possible without departing from the scope of the analytical principle outlined.

Some of the salient features of the present invention will be summarized in the following.

(1) The present invention provides an analytical method for separating a multiple reflection beam from a simple reflection beam in light-based distance measuring techniques, thereby achieving high precision in distance measurements for those objects susceptible to producing multiple reflections because of their shape or surface reflectivity.

(2) The present invention achieves measurement precision, regardless of the presence of multiple reflections, by analytically restoring luminosity in energy distribution data created by a simple reflection beam so as to determine a focal position of a light spot precisely.

(3) The present invention thus provides a high precision distance measuring apparatus of wide applicability in new fields of application which have not been practical in the conventional apparatus, because of the loss of precision caused by multiple reflections.

(4) The present invention is effective even when only simple reflection is involved because the precise position of a light spot can be determined more quickly compared with those conventional techniques using the maximum value or weighting of light spot.

(5) The present invention extends the precision of distance measurement using simple reflection by applying various types of distribution functions to better restore luminosity data to compensate for distortions in energy distribution data to suit different surface conditions of the object.

What is claimed is:

1. A method for separating a plurality of light spots, comprising the steps of:
    obtaining a luminous energy distribution curve created from a plurality of light spots, formed simultaneously on a light receiving surface provided in a photo-detector member of not less than one-dimensional response capability;
    calculating a maximum value of each peak, minimum values and inflection points in said luminous energy distribution curve;
    if a plurality of maximum values are present in said luminous energy distribution curve, dividing said luminous energy distribution curves into individual luminous energy distribution curves at either a minimum value or an inflection point surrounding each peak whichever is closer to said maximum values; and
    if only one maximum value is present in said luminous energy distribution curve, dividing said luminous energy distribution curve into an individual luminous energy distribution curve at inflection points.

2. A method for detecting a focal position, wherein a focal position of a light spot is detected from luminous energy distribution data of individual light spots separated by using the spot separation method disclosed in claim 1.

3. A method according to claim 2, wherein said focal position is chosen according to a weighted average position of luminous energy distribution data for individual light spots.

4. A method according to claim 2, wherein said focal position is chosen according to a maximum value of luminous energy distribution data for individual light spots.

5. A method according to claim 2, wherein said focal position is chosen according to a center value of luminous energy distribution data for individual light spots.

6. A method for selecting a light spot created from a plurality of light spots, formed simultaneously on a light receiving surface provided in a photo-detector member of not less than one-dimensional response capability, producing a plurality of maximum values corresponding to each peak in a luminous energy distribution curve generated by said photo-detector member, comprising the steps of:
    selecting maximum values which exceed a predetermined threshold value;
    obtaining an apparent distance represented by each selected maximum value; and
    choosing the maximum value corresponding to the minimum of the obtained distance as a reflected light spot for measuring a correct distance.

7. A method for restoring luminosity to individual luminous energy distribution curves, when said curves are partly or wholly produced on a light receiving surface provided in a photo-detector member of not less than one-dimensional response capability, comprising the steps of:
    applying a distribution function which approximates a luminous energy distribution curve obtained from a light source;
    obtaining parameters, which are used by the distribution function, from each luminous energy distribution curve; and
    restoring individual luminous energy distribution curves of each light spot by applying the parameters to the distribution function.

8. A method according to claim 7, wherein, when a maximum value and inflection points of a luminous energy distribution curve are given, a luminosity distribution restoration process is performed by using a distribution function whose average value and standard deviation correlate, respectively, with said maximum value and said inflection point, so as to restore the individual luminous energy distribution curves of each light spot.

9. A method according to claim 8, wherein said luminosity distribution restoration process for an asymmetrical luminous energy distribution curve is performed using distribution functions whose standard deviations are different but a left-side and a right-side of each function share a common average value.

10. A method according to claim 8, wherein said distribution function is a normal distribution function.

11. A method according to claim 10, wherein said luminosity distribution restoration process for an asymmetrical luminous energy distribution curve is performed by using normal distribution functions having a common average value but different standard deviation values.

12. A method for measuring a distance comprising the steps of: irradiating an object to be measured with a light beam generated from a light source; focusing a reflection beam reflected from said object on a receiving surface of a photo-detector member through an optical device, and determining a focal position according to a focal position detection process to derive said distance; wherein, prior to undertaking said focal position detection process, the method includes a step of restoring luminosity in said luminous energy distribution curve according to method disclosed in claim 7.

13. A method according to claim 12, wherein said step of restoring luminosity is performed according to the method disclosed in claim 8.

14. A method for measuring a distance comprising the steps of:

obtaining a luminous energy distribution curve generated by the steps of directing a light beam generated from a light source on an object to be measured, and focusing reflection beams reflected from said object on a receiving surface of a photo-detector member through an optical device;

if a plurality of peaks are present in said luminous energy distribution curve, separating said luminous energy distribution curve into separate peaks attributable to each light spot;

selecting one light spot, which is generated by a direct reflection beam, from the separated light spots;

determining a focal position of the selected light spot; and measuring a distance to said object using the determined focal position.

15. A method according to claim 14, wherein said step of selecting one light spot includes the steps of:

obtaining each peak of said luminous energy distribution curve as a maximum value;

selecting maximum values which exceed a predetermined threshold value, from the obtained maximum values;

obtaining each apparent distance represented by the selected maximum values; and choosing the maximum value corresponding to the minimum of the obtained distance as a reflected light spot for measuring a correct distance.

16. A method according to claim 14, wherein said peaks are separated according to the method disclosed in claim 1.

17. A method according to claim 12, wherein said method further includes a step of restoring a luminous energy distribution curve of the light spot selected by said step of selecting a correct light spot.

18. A method according to claim 17, wherein said step of restoring luminosity is performed according to the method disclosed in claim 7.

19. A method according to claim 14, wherein said step of determining a focal position is performed according to the method disclosed in claim 2.

20. A distance measuring apparatus comprising:

a light source for directing a beam of light on an object to be measured;

a photo-detector member for converting light energy from reflection beam received from said object into electrical signals representing light positions and associated luminous energies;

a light receiving section for focusing said reflection beam on a receiving surface as light spots;

a spot separation section for separating luminous energy distribution data generated by said photo-detector member into separate luminosity curves attributable to individual light spots;

a spot selection section for selecting one light spot, which is focused by a direct reflection beam, from light spots separated by said spot separation section;

a focal position detection section for determining a focal position of the selected light spot;

a distance computation section for computing a distance between the focal position and said object using the detected focal position; and a control section for controlling the light source, the spot separation section, the spot selection section, the focal position detection section and the distance computation section.

21. An apparatus according to claim 20, wherein;

said apparatus is further provided with a luminosity distribution restoration section for restoring an individual luminous energy distribution data of the selected light spot using the separated luminous energy distribution data of the selected light spot selected by the spot selection section; and the focal position detection section determines a focal position of said correct light spot according to the restored luminous energy distribution data; and the control section also controls the luminosity distribution restoration section.

22. An apparatus according to claim 21, wherein said luminosity distributions restoration section carries out the restoration of the individual luminous energy distribution data by the process of:

applying a distribution function which approximates a luminous energy distribution curve of a light source;

obtaining parameters, which are used by the distribution function, from the luminous energy distribution data; and restoring individual luminous energy distribution data of each light spot by applying the parameters to the distribution function.

23. An apparatus according to claim 20, wherein said apparatus is further provided with a first output light control section for controlling a first rotation mirror to direct a beam of light emitted from the light source to a first axial direction, and a second output light control section for controlling a second rotation mirror to direct a beam of light leaving said first output light control section.

24. An apparatus according to claim 23, wherein said apparatus is further provided with an input light control section for controlling a beam of light emitted from the light source to focus on a light spot of the detector member corresponding to a location of a measuring object, by providing a third rotation mirror synchronizes with said second rotation mirror.

25. An apparatus according to claim 24, wherein said second rotation mirror and said third rotation mirror are formed as a unit.

26. An apparatus according to claim 20, wherein said apparatus is a synchronized scanning range finder.

27. A distance measuring apparatus comprising:

a light source for directing a beam of light on an object to be measured;

a photo-detector member for converting received light energy into electrical signals representing a light spot and an associated luminous energy;

a light receiving section for focusing a beam of light reflected from said object;

a luminosity distribution restoration section for restoring luminosity of an individual luminous energy distribution data of a light spot using luminous energy distribution data generated by said photo-detector member and a predetermined distribution function;

a focal position detection section for determining a focal position of said light spot according to said individual luminous energy distribution data;

a distance computation section for computing a distance between the focal position and said object according to said focal position; and a control section for controlling the light source, the luminosity distribution restoration section, the focal position detection section and the distance computation section.

28. An apparatus according to claim 27, wherein said luminosity distribution restoration section carries out the restoration of the individual luminous energy distribution data by the process of:

applying a distribution function which approximates a luminous energy distribution curve of a light source;

obtaining parameters, which are used by the distribution function, from the each luminous energy distribution data; and restoring individual luminous energy distribution data of each light spot by applying the parameters to the distribution function.

29. A computer-readable recording medium storing a light spot separation program for instructing a computer to separate a plurality of light spots, said light spots separation program carrying out the steps of:

inputting a luminous energy distribution data created from a plurality of light spots, formed simultaneously on a light receiving surface provided in a photo-detector member of not less than one-dimensional response capability;

computing a maximum value of each peak, minimum values and inflection points in said luminous energy distribution data;

if a plurality of maximum values are present in said luminous energy distribution, dividing said luminous energy distribution data into separate luminous energy distribution data at either a minimum value or an inflection point surrounding each peak whichever is closer to said maximum value; and if only one maximum value is present in said luminous energy distribution data, dividing said luminous energy distribution data into an individual luminous energy distribution data at inflection points.

30. A computer-readable recording medium storing a light spot selection program for instructing a computer to select a light spot from a plurality of light spots focused simultaneously on a light receiving surface of a photo-detector member, of not less than one-dimensional response capability, forming luminous energy distribution data with a plurality of peaks, in not less than one-dimension, said light spot selection program carrying out the steps of:

inputting a plurality of maximum values for each peak in said luminous energy distribution data produced by the photo-detector member;

selecting maximum values which exceed a predetermined threshold value;

obtaining each apparent distance represented by the selected maximum values; and choosing the maximum value corresponding to the minimum of the obtained distance as a reflected light spot for measuring a correct distance.

31. A computer-readable recording medium storing a luminosity distribution restoration program for instructing a computer to restore luminosity to individual luminous energy distribution data, when said curves are partly of wholly produced on a light receiving surface provided in a photo-detector member of not less than one-dimensional response capability, said luminosity distribution restoration program carrying out the steps of:

applying a distribution function which approximates luminous energy distribution data obtained from a light source;

calculating parameters, which are used by the distribution function, from the each luminous energy distribution data; and restoring individual luminous energy distribution data of each light spot by applying the parameters to the distribution function.

32. A computer-readable recoding medium storing a distance measuring program for instructing a computer to derive a distance to an object to be measured, said program carrying out the steps of:

inputting luminous energy distribution data generated by the steps of directing a light beam generated from a light source on an object to be measured, and focusing reflection beams reflected from said object on a receiving surface of a photo-detector member through an optical device;

if a plurality of peaks are present in said luminous energy distribution data, separating said luminous energy distribution data into separate peaks attributable to each light spot;

selecting one light spot, which is generated by a direct reflection beam, from the separated light spots;

determining a focal position of the selected light spot; and measuring a distance to said object by using the determined focal position.

* * * * *